Aug. 15, 1967  J. T. SCHULLER ET AL  3,335,838
COIN CONTROLLED ACCUMULATOR WITH ARTICLE AND CHANGE DISPENSERS
Filed April 11, 1966  14 Sheets-Sheet 1

James T. Schuller,
Harry C. Haeusser,
Inventors.
Koenig, Senniger,
Powers and Leavitt,
Attorneys.

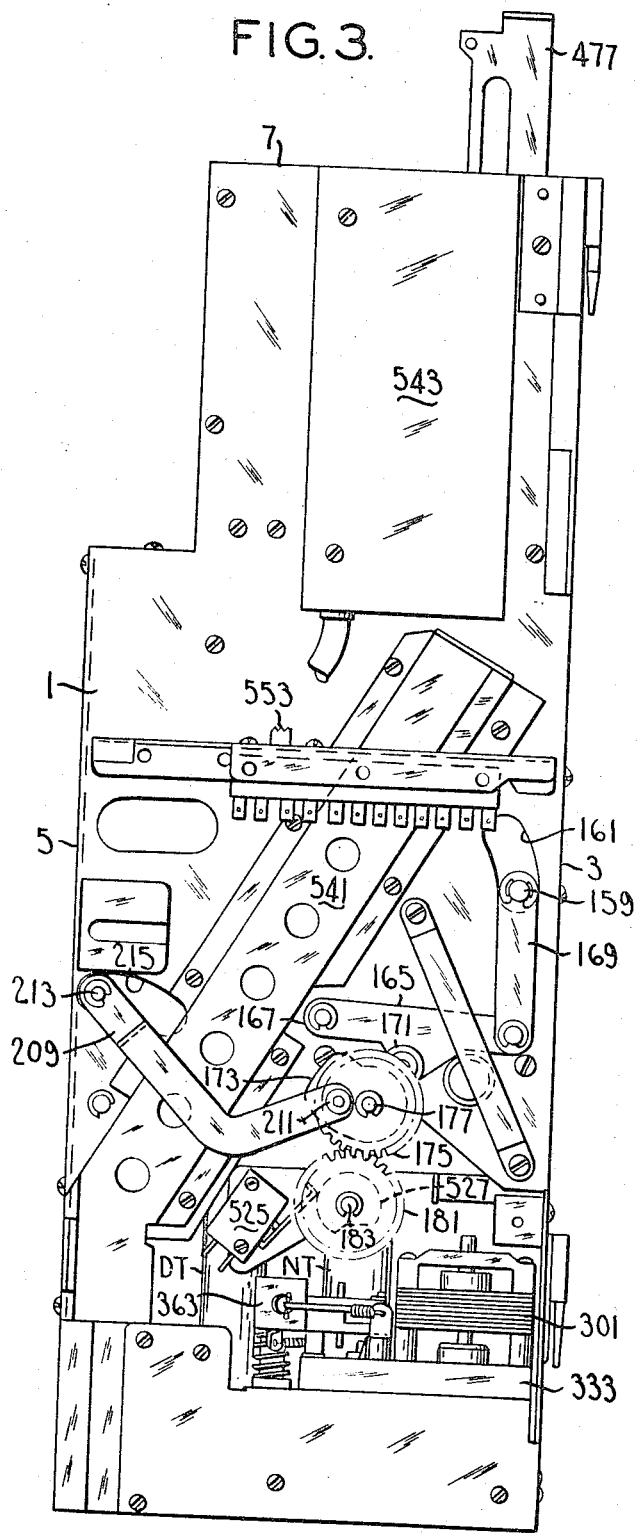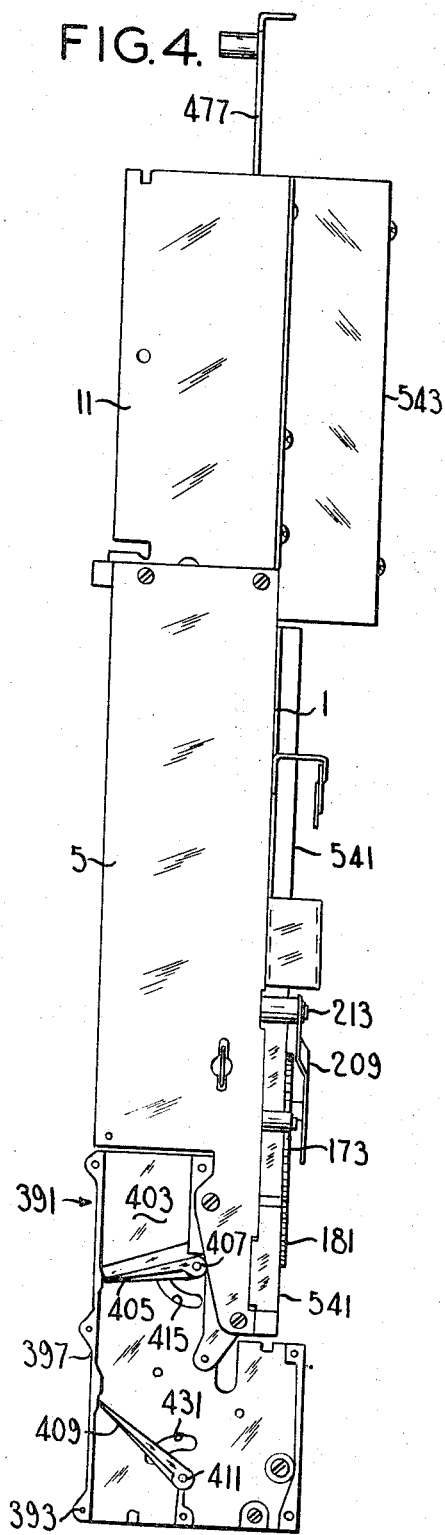

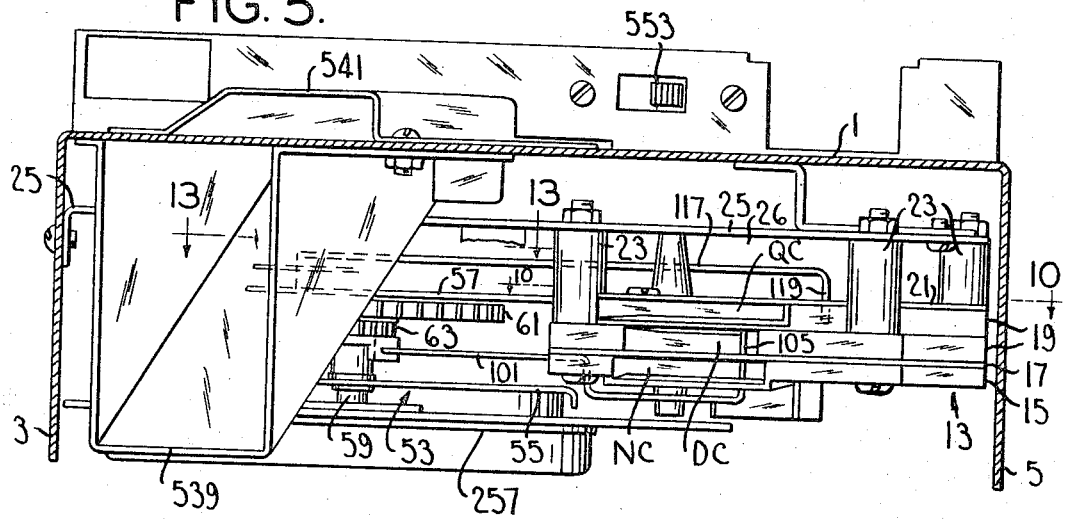
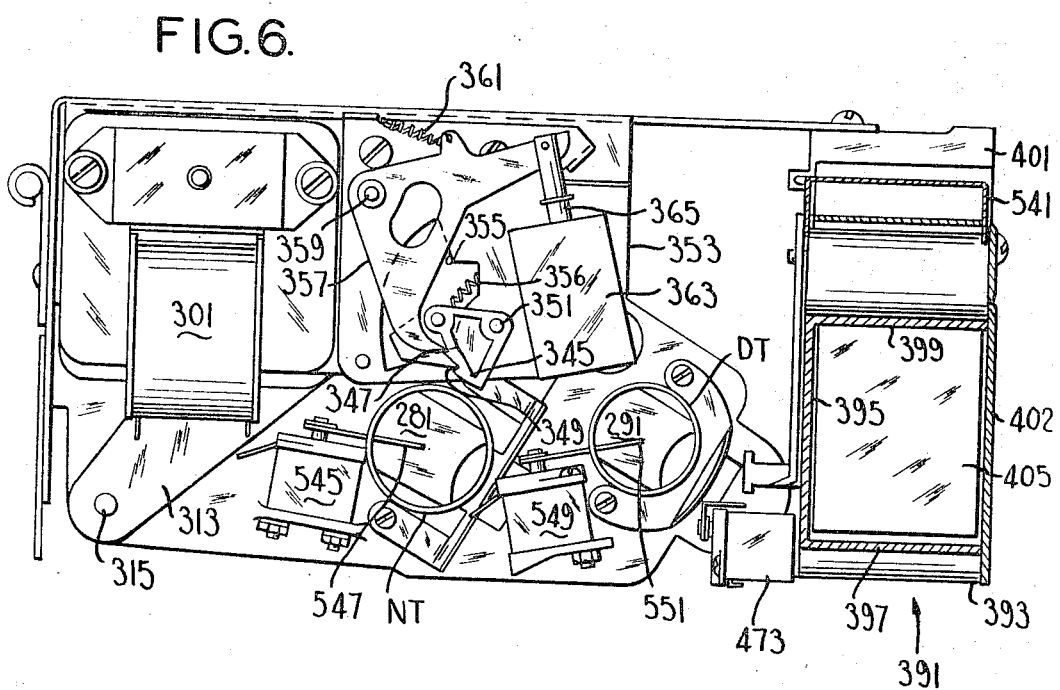

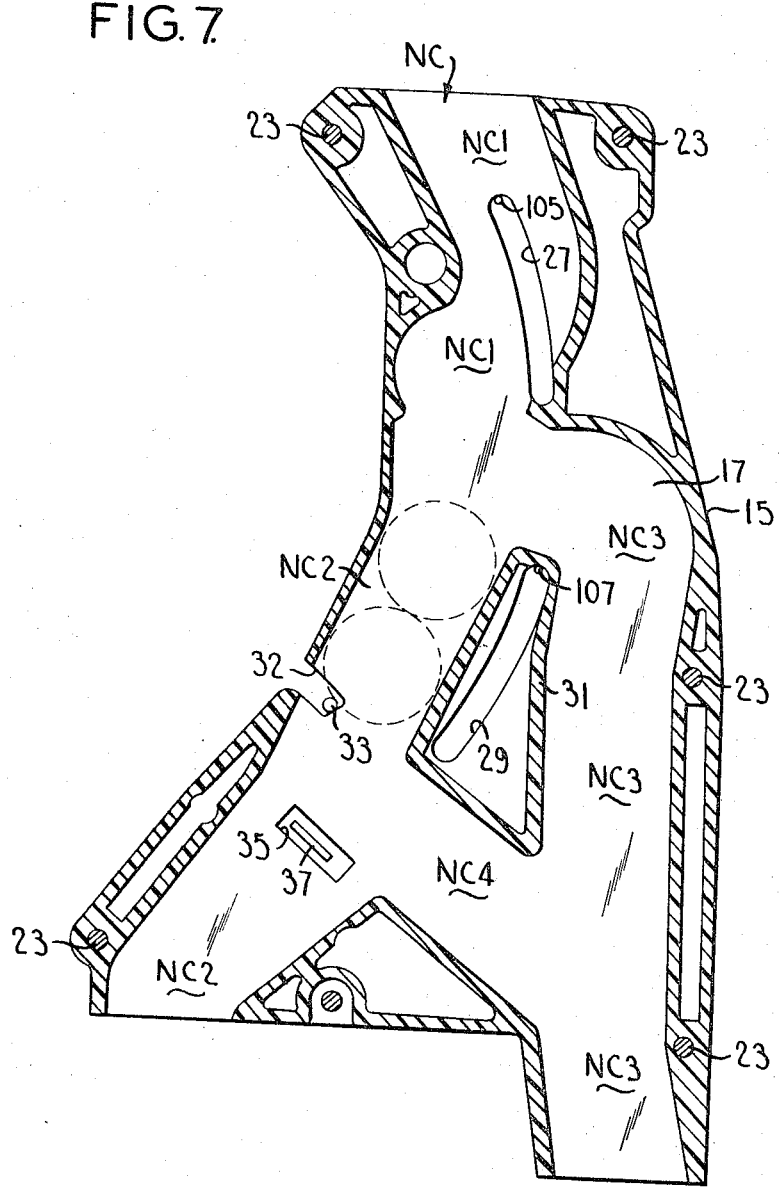

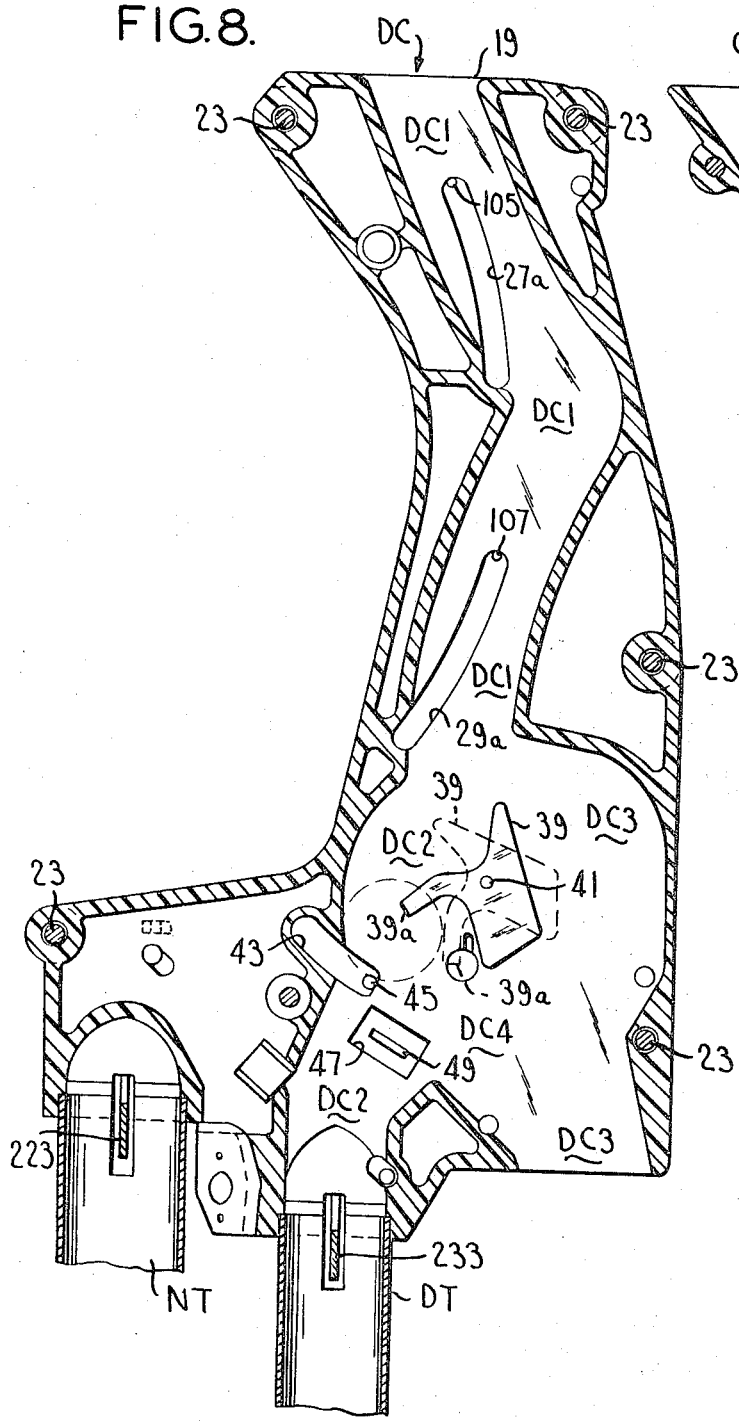
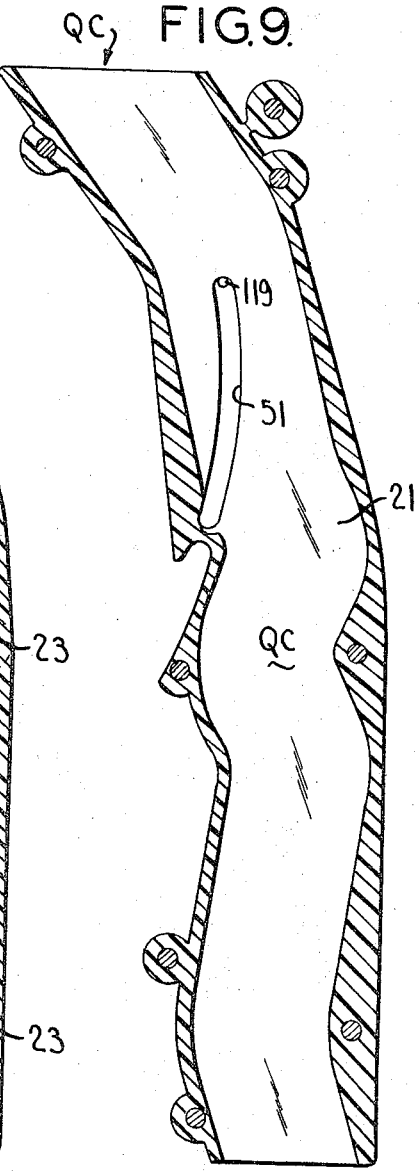

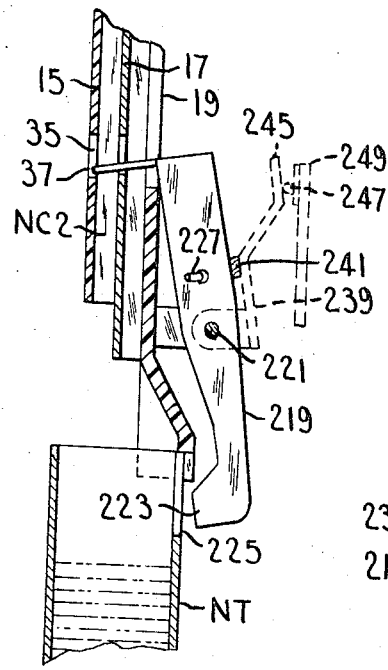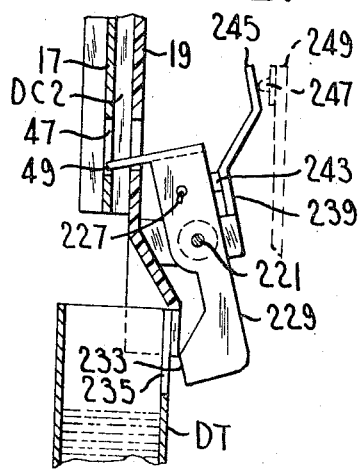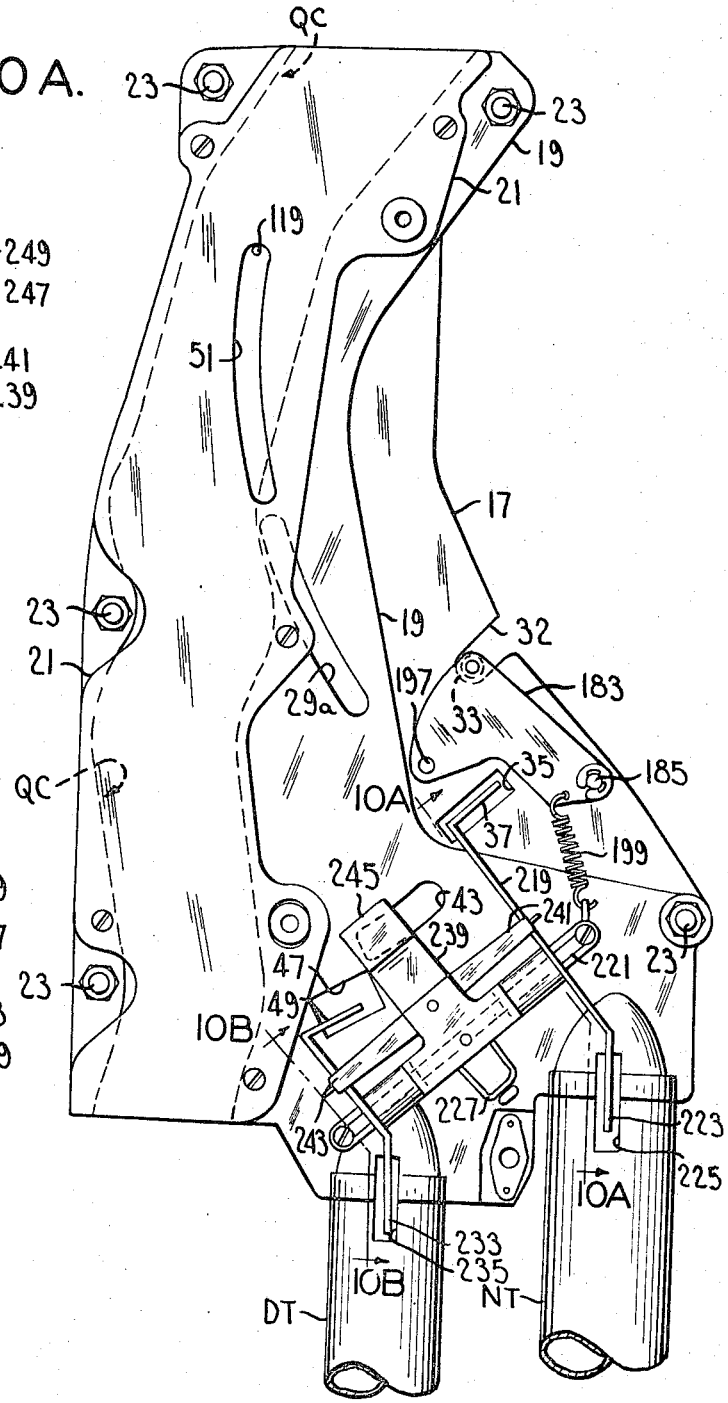

Aug. 15, 1967    J. T. SCHULLER ET AL    3,335,838
COIN CONTROLLED ACCUMULATOR WITH ARTICLE AND CHANGE DISPENSERS
Filed April 11, 1966                    14 Sheets-Sheet 7

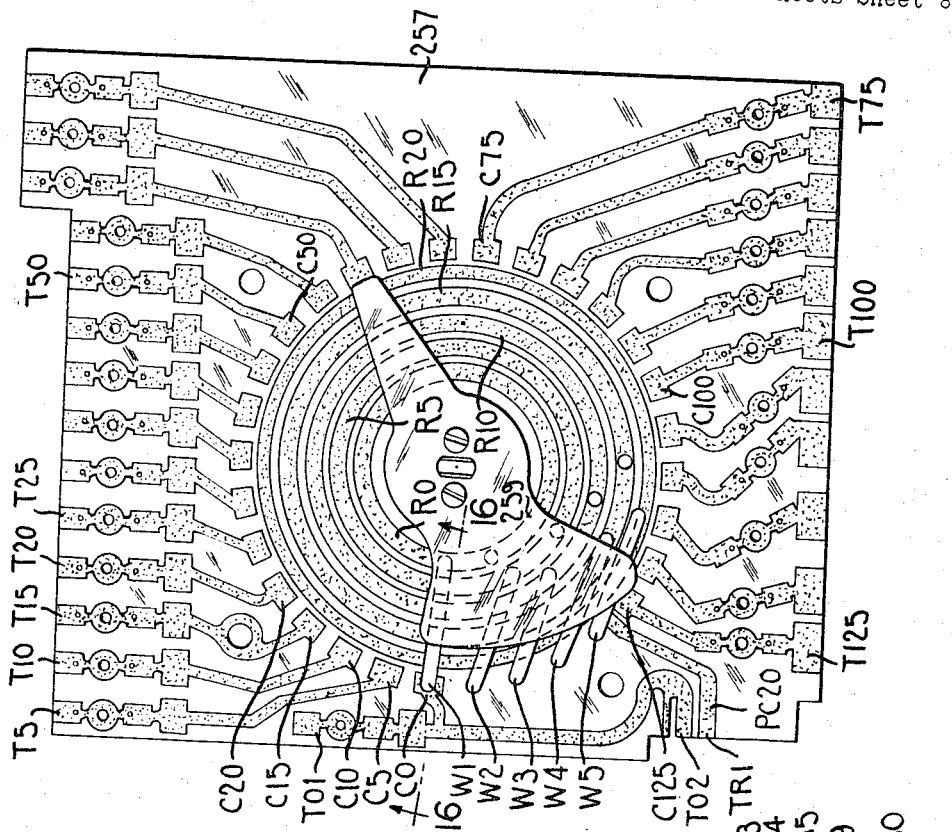
FIG.14.
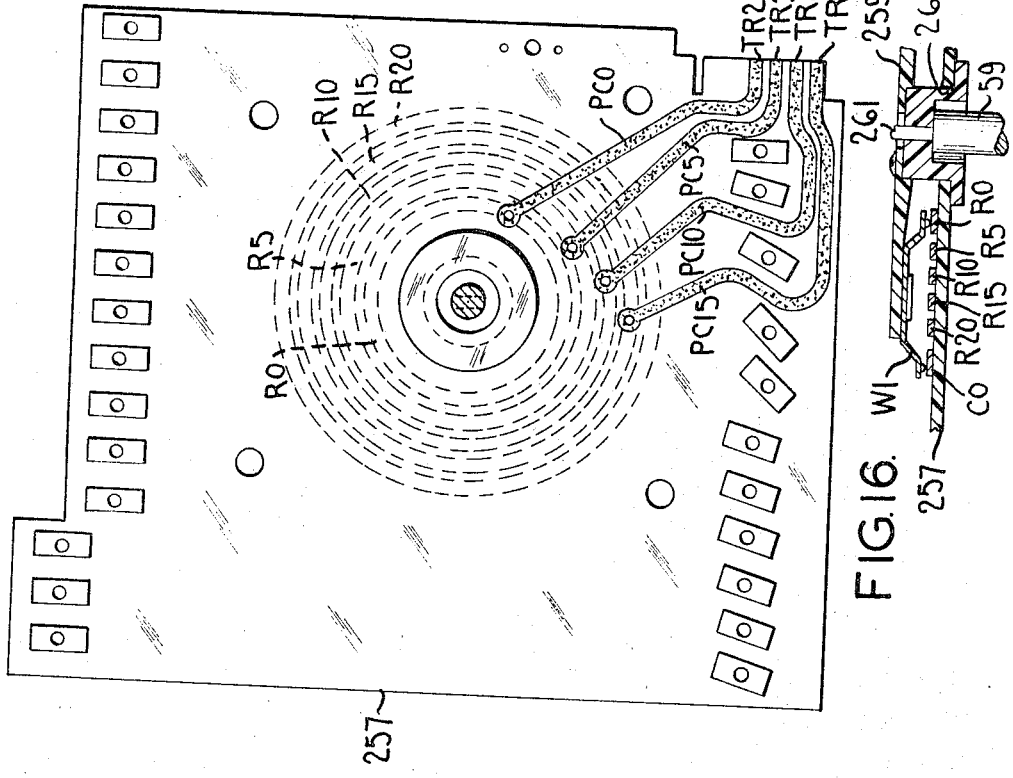
FIG.15.
FIG.16.

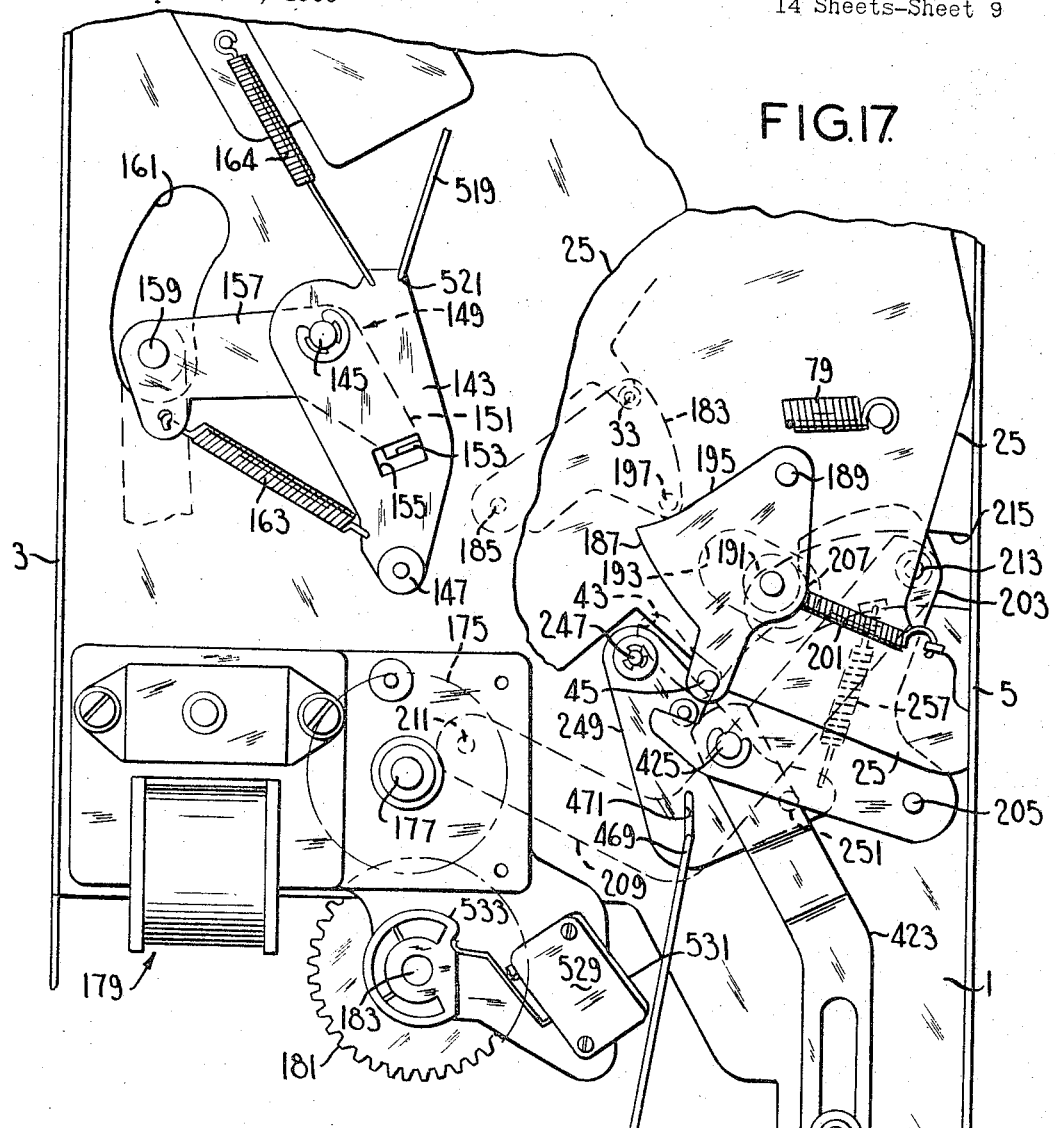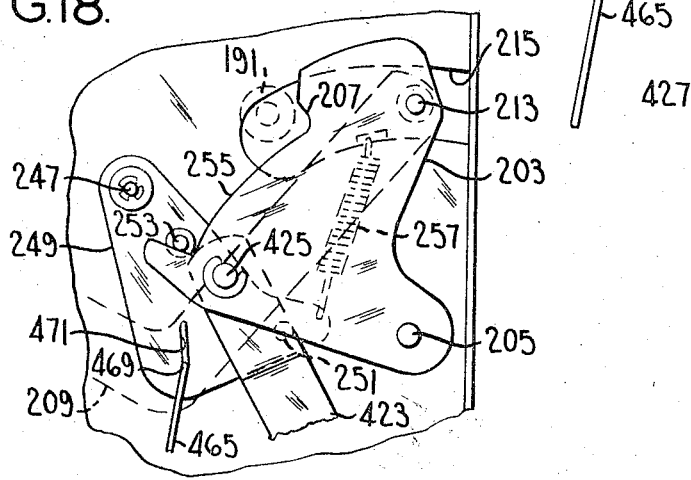

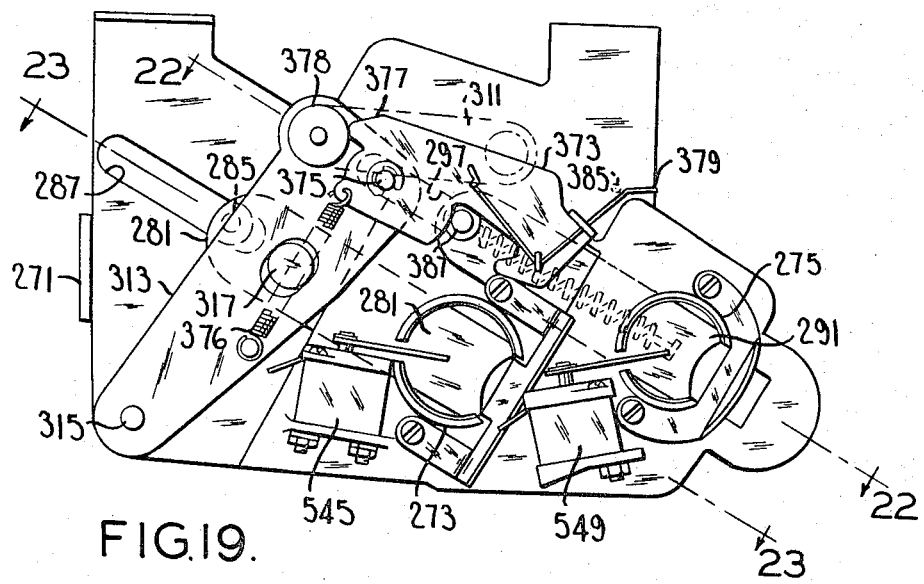
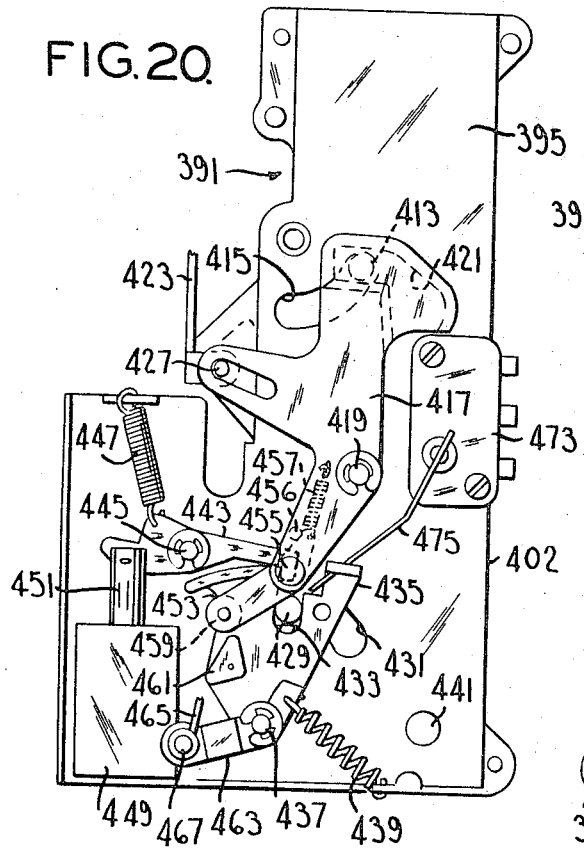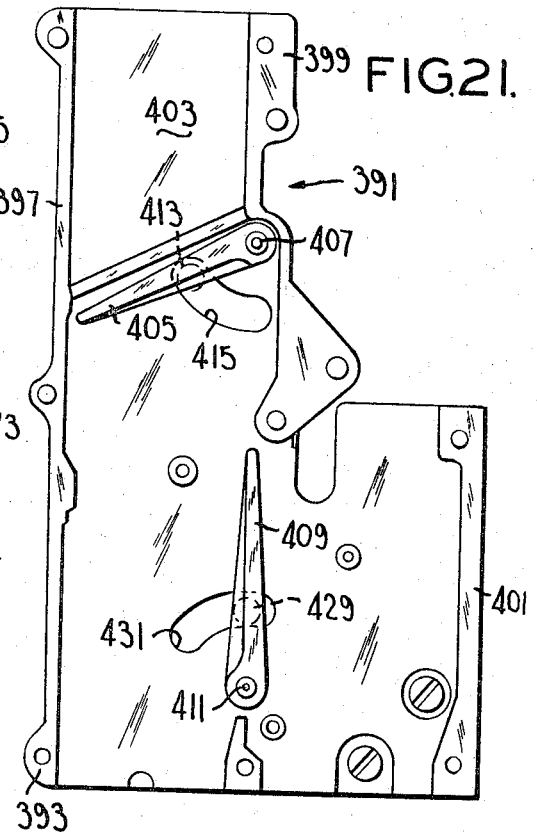

United States Patent Office 3,335,838
Patented Aug. 15, 1967

3,335,838
COIN CONTROLLED ACCUMULATOR WITH
ARTICLE AND CHANGE DISPENSERS
James T. Schuller and Harry C. Haeusser, St. Louis, Mo.,
assignors to Universal Match Corporation, St. Louis,
Mo., a corporation of Delaware
Filed Apr. 11, 1966, Ser. No. 541,852
17 Claims. (Cl. 194—10)

This invention relates to coin apparatus, and more particularly to a coin handling and change-making device for controlling the operation of a vending machine for vending items at different prices and for making change in accordance with the amount in coin deposited in the machine and the price of an item selected by a purchaser.

The invention is especially concerned with coin apparatus adapted to accept nickels, dimes and quarters and to control the operation of a vending machine for vending items at prices in the series 5¢, 10¢, 15¢, 20¢, 25¢, etc., among the several objects of the invention being noted the provision of improved apparatus for this purpose which is adapted to issue change in appropriate amount, and more particularly adapted to issue a nickel in change when 5¢ in change is called for, two nickels in change when 10¢ in change is called for, a nickel and a dime in change when 15¢ in change is called for, and two nickels and a dime in change when 20¢ in change is called for. Further objects of the invention to be noted are the proviison of apparatus such as described in which coins (more particularly nickels and dimes) deposited in the apparatus are fed to the change coin supply for maintaining a stock of change coins; the provision of apparatus such as described in which deposited coins are escrowed for return if a purchase is cancelled; the provision of apparatus such as described adapted for controlling the operation of a vending machine for vending items on deposit of exact amounts without making change, either as a result of depletion of the supply of change coins or by a simple manual disconnection; and the provision of apparatus such as described having a tube for holding a stack of nickels to be issued in change and a tube for holding a stack of dimes to be issued in change, with an ejector for each tube, wherein the nickel ejector is stroked once for issue of 5¢ in change, twice for issue of 10¢ in change, and the dime ejector is actuated once from the nickel ejector for issuing 15¢ or 20¢ in change. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a front elevation of a coin apparatus of this invention, with a cover of a totalizer switch of the apparatus partly broken away;

FIG. 3 is a rear elevation of the apparatus;

FIG. 4 is a view in elevation of the right side of the apparatus (as viewed from the right side of FIG. 1), with a cover plate of an escrow unit of the apparatus removed, and showing a deflector of the escrow unit in its coin return position;

FIG. 5 is an enlarged horizontal section taken on line 5—5 of FIG. 1;

FIG. 6 is an enlarged horizontal section taken on line 6—6 of FIG. 1, showing certain change-making mechanism of the apparatus;

FIG. 7 is a view showing the nickel chute of the apparatus;

FIG. 8 is a view showing the dime chute of the apparatus;

FIG. 9 is a view showing the quarter chute of the apparatus;

FIG. 10 is a view on line 10—10 of FIG. 5 of the back of the coin chute assembly of the apparatus;

FIGS. 10A and 10B are sections on lines 10A—10A and 10B—10B, respectively, of FIG. 10;

FIG. 14 is an enlarged front elevation of the totalizer switch of the apparatus;

FIG. 15 is a rear elevation of FIG. 14;

FIG. 16 is a section on line 16—16 of FIG. 14;

FIG. 17 is a view showing certain reset mechanism of the apparatus;

FIG. 18 is a fragment of FIG. 17 with certain parts removed;

FIG. 19 is a fragment of FIG. 6 with certain parts removed;

FIG. 20 is an enlarged view on line 20—20 of FIG. 1, showing the escrow unit;

FIG. 21 is an enlarged fragment of FIG. 4, showing the escrow unit with the deflector in normal position;

Figure 1:
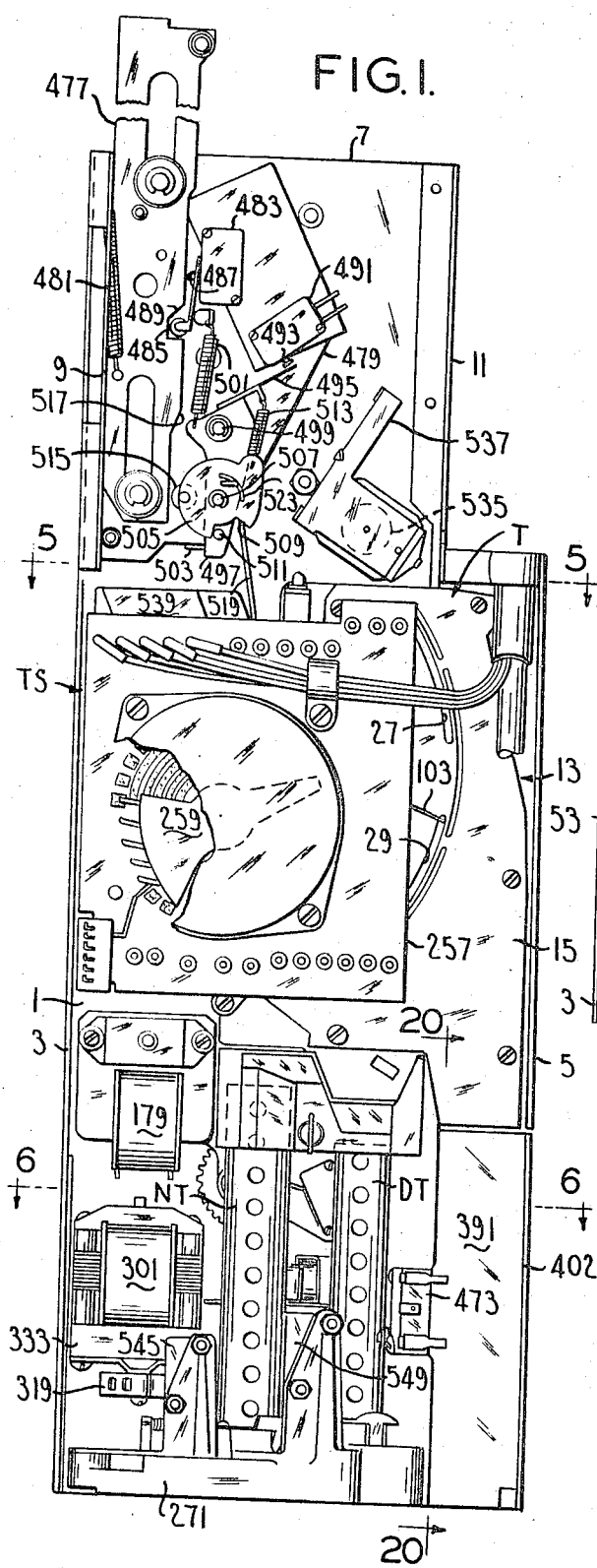
Figure 22:
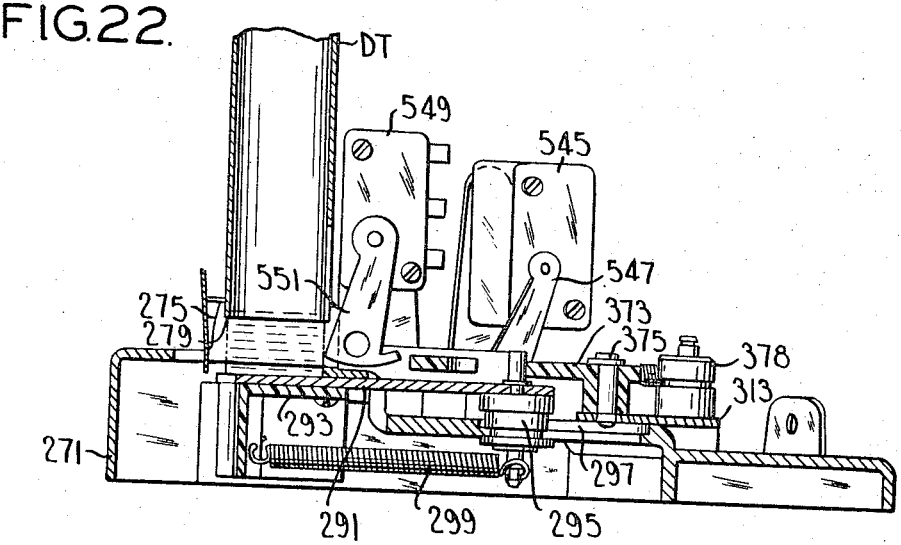
Figure 23:
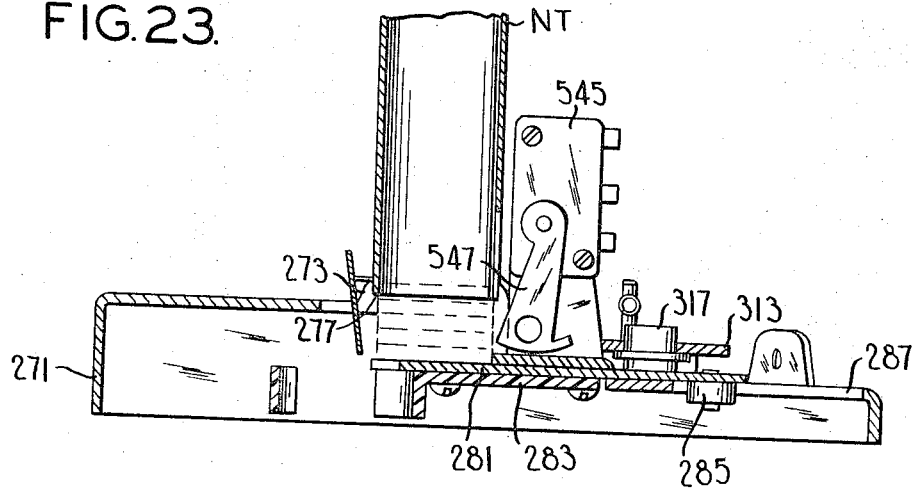
Figure 24:
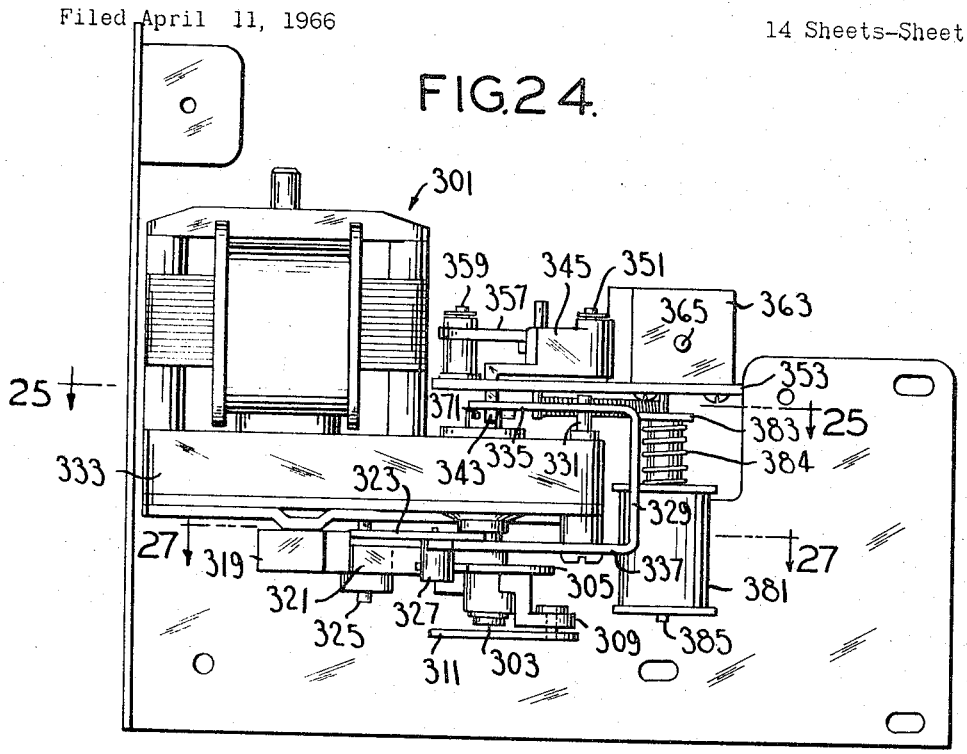
Figures 25, 26, 27, 28:
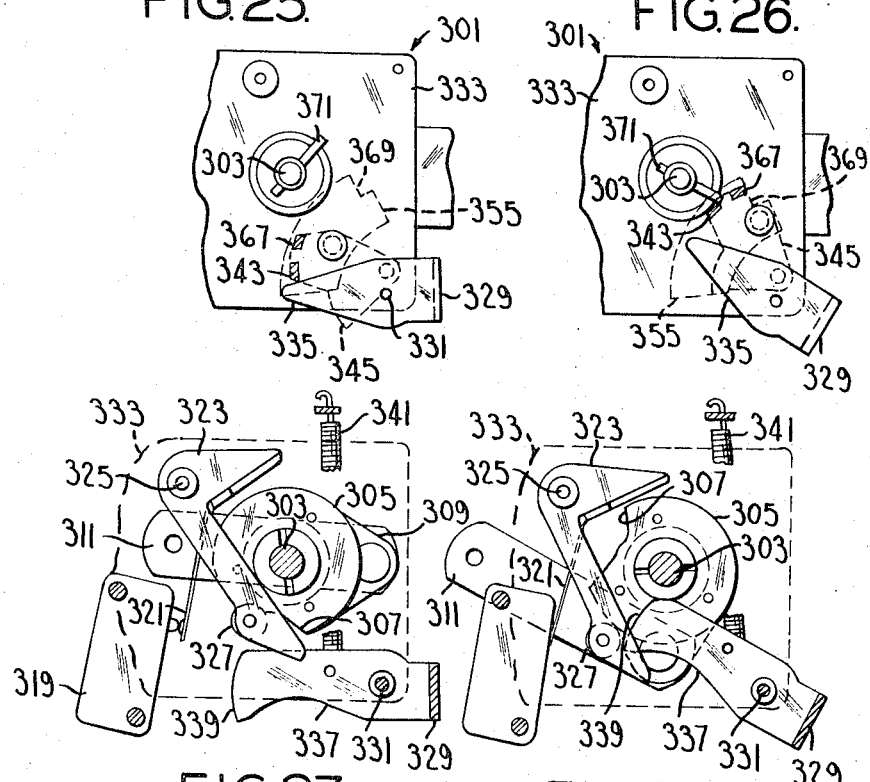
Figure 29:
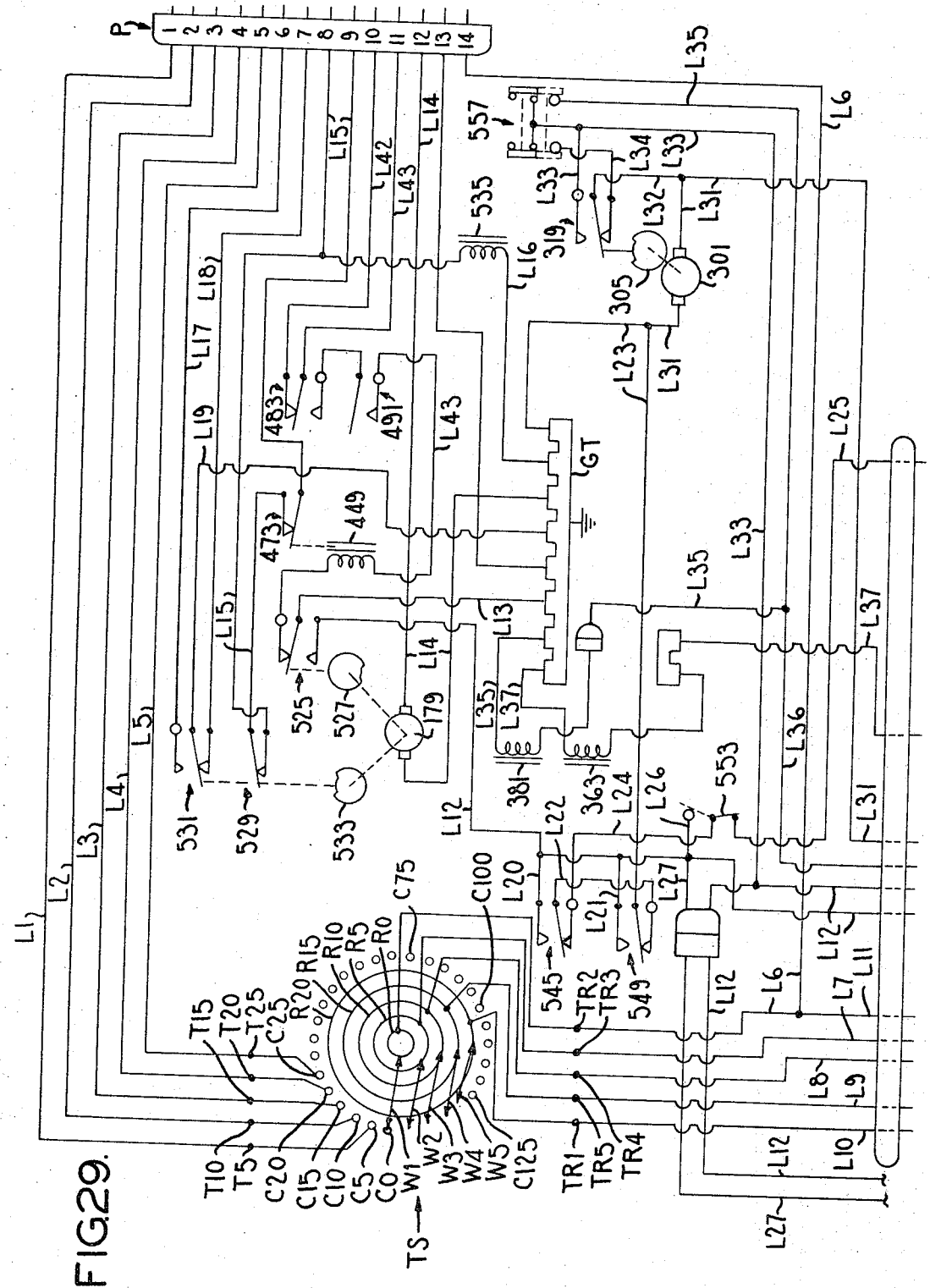

FIGS. 22 and 23 are sections on lines 22—22 and 23—23 of FIG. 19;

FIG. 24 is an enlarged fragment of FIG. 1 with certain parts removed, showing certain features of the change-making mechanism;

FIG. 25 is a horizontal section on line 25—25 of FIG. 24;

FIG. 26 is a view similar to FIG. 25 showing a moved position of parts;

FIG. 27 is a horizontal section on line 27—27 of FIG. 24;

FIG. 28 is a view similar to FIG. 27 showing a moved position of parts (corresponding to the FIG. 26 position of parts);

FIG. 29 is a wiring diagram; and

Figure 30:
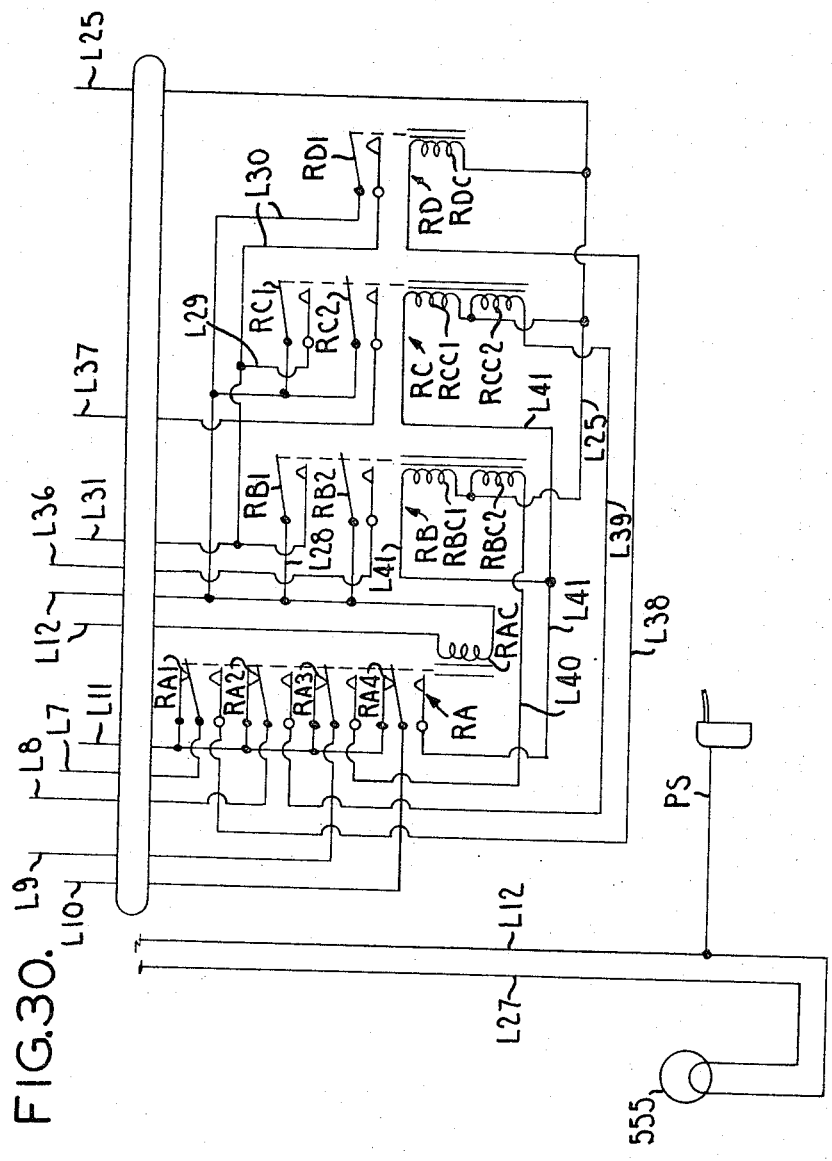

FIG. 30 is a continuation of the FIG. 29 wiring diagram.

Corresponding reference characters indicate corresponding parts throughout the several views of the drawings.

Referring to the drawings, first more particularly to FIGS. 1–5, a coin apparatus constructed in accordance with this invention is shown to comprise a main mechanism plate 1 having left and right side flanges 3 and 5. This plate has an upper extension 7, somewhat narrower than its main body portion, provided with left and right side flanges 9 and 11. The latter flanges define a space for a conventional coin selector and slug rejector (not shown) which takes nickels, dimes and quarters deposited in the vending machine in which the apparatus is used, and separates them for delivery of nickels to a nickel chute NC, dimes to a dime chute DC and quarters to a quarter chute QC of a totalizer unit T located in the upper portion of the space between flanges 3 and 5.

The totalizer unit T comprises a coin chute assembly designated in its entirety by the reference numeral 13. As shown in FIGS. 5 and 7–10, this is made of four plates designated in order from front to back 15, 17, 19 and 21. The first plate 15 (the front plate) is molded with grooving in its back face to provide the nickel chute NC. The third plate 19 is molded with grooving in its front face to provide the dime chute DC and with grooving in its back face to provide the quarter chute QC. The second plate 17 (which may be a thin sheet metal plate) is sandwiched between plate 15 and the front of plate 19 to constitute a back wall for the nickel chute and a front wall for the dime chute. The fourth plate 21 (which may be a thin sheet metal plate) constitutes a back wall for the quarter chute. The coin chute assembly is hung in vertical position toward the left side of main plate on studs 23 which extend forward from a mounting plate 25 spaced forward of plate 1. There is a space 26 between plate 25 and the coin chute assembly 13.

As shown in FIG. 7, the nickel chute NC (formed in the back of plate 15) has an upper entrance passage NC1 and a passage NC2 in continuation of the entrance passage which curves to the left as viewed from the front, continuing to the lower end of the coin chute assembly. Branching off to the right from the upper end of the passage NC2, immediately below the lower end of the entrance passage, and then extending downward to the lower end of the coin chute assembly, is a passage NC3. Plates 15 and 17 have an arcuate slot 27 curving down and to the right from a point adjacent the upper end of entrance passage NC1 and generally in the center of the entrance passage to a point at the right of the lower end of the entrance passage. Below this slot 27 is a second arcuate slot 29 in plates 15 and 17, on the same center as slot 27. Slot 29 is located between passages NC2 and NC3 and is surrounded by a wall 31. Below slot 29, the nickel chute has an inclined cross-passage NC4 leading downward from passage NC2 to passage NC3. Wall 31 defines the right side of passage NC2, the left side of passage NC3 and the top of passage NC4. Plates 15 and 17 have a notch 32 in their left edge located opposite the lower end of slot 29 and just above the cross-passage NC4. This notch is adapted for entry of a pin 33 to intercept nickels falling in passage NC2 and hold back two nickels, additional nickels being then diverted into branch passage NC3. Plates 15 and 17 also have an opening 35 located crosswise of passage NC2 adjacent the bottom of cross-passage NC4 adapted for entry of a gate 37 to block passage NC2 and divert coins falling in passage NC2 into the passage NC4 and thence to branch passage NC3.

As shown in FIG. 8, the dime chute DC (formed in the front of plate 19) has an upper entrance passage DC1, a passage DC2 in continuation of the entrance passage at the left and a passage DC3 branching off to the right from the upper end of passage DC2 immediately below the lower end of the entrance passage and extending down to the lower end of the coin chute assembly. The entrance passage DC1 of the dime chute is longer than the entrance passage NC1 of the nickel chute. Plate 19 has arcuate slots 27a and 29a registering with slots 27 and 29. Slots 27a curves down and toward the right from a point adjacent the upper end of entrance passage DC1 generally in the center of the entrance passage to a point at the left of this passage. Slot 29a curves down and toward the left from a point generally in the center of the entrance passage to a point at the left of the lower end of the entrance passage. The separation between passages DC2 and DC3 is provided by a toggle 39 pivoted at 41 on the plate 19. Below the toggle is a gap DC4 constituting a cross-passage from passage DC2 to passage DC3. Plate 19 has an arcuate slot 43 accommodating a pin 45 adapted to move between a retracted position clear of passage DC2 to a position blocking passage DC2 to hold back one dime in passage DC2 above cross-passage DC4, additional dimes then being diverted into branch passage DC3. Plate 19 also has an opening 47 at the entrance to cross-passage DC4 adapted for entry of a gate 49 to block passage DC2 and divert dimes falling in passage DC2 through cross-passage DC4 to passage DC3. The toggle is inherently gravity biased to occupy its solid-line position of FIG. 8. A dime falling in the dime chute strikes an arm 39a of the toggle and the dime comes to rest on pin 45. This swings the toggle to its dotted-line position of FIG. 8 to divert a second dime and any succeeding dimes into chute passage DC3.

As shown in FIG. 9, the quarter chute QC is constituted by a single passage from the upper to the lower end of the coin chute assembly. Plate 21 (the back wall of the quarter chute) has an arcuate slot 51 on the same center as slots 27 and 27a which curves down and to the left (as viewed from the front in FIG. 9) from a point adjacent the upper end of the chute and generally in the center of the chute to a point at the left of the chute.

At the left of the coin chute assembly is mounted a coin-actuated escapement mechanism designated in its entirety by the reference numeral 53 (see FIGS. 2, 5 and 11–13). This comprises a front plate 55 and a rear plate 57, the latter being spaced forward of mounting plate 25. A shaft 59 carrying a toothed escapement wheel 61 clustered with a pinion 63 is journalled in plates 55 and 57, projecting at its forward end from the front plate 55. A sector gear 65 pivoted at 67 between plates 55 and 57 meshes with the pinion. A lever 69 is pivoted at 67 on the back of plate 57 and has forwardly projecting lugs 71 and 73 straddling an arm 77 on the sector gear. A coil tension spring 79 having one end attached to mounting plate 25 and its other end attached to lever 69 acts via lever 69 to bias the sector gear to rotate counterclockwise as viewed from the front in FIGS. 11 and 12, thereby biasing the escapement wheel 61 to rotate clockwise as viewed from the front in FIGS. 11 and 12. A pawl 83 pivoted at 85 between the plates 55 and 57 is biased by a spring 87 for engagement of a tooth 88 on the pawl with the escapement wheel releasably to hold the wheel against forward (clockwise) rotation under the spring bias. The wheel is rotatable rearward (counterclockwise) against the spring bias to what is referred to as a zero position determined by engagement of a projection 89 on the back of the wheel with a stop 91 struck forward from rear plate 57.

An escapement lever 93 is pivoted at 95 between plates 55 and 57. This lever is provided on the back with a pallet 97 adapted for engagement with the teeth of the escapement wheel. Extending to the right from the lever in front of the coin chute assembly are two trip wires 101 and 103, disposed at an angle to one another, wire 101 being above wire 103. Wire 101 has a finger 105 at its right end which reaches through slots 27 and 27a across both the nickel and dime chute passages NC1 and DC1. Wire 103 has a finger 107 at its right end which reaches through slots 29 and 29a across the dime chute passage DC2 below finger 105. Lever 93 is biased by a hairspring 109 to rotate counterclockwise as viewed from the front in FIGS. 11 and 12 to retracted position illustrated in FIG. 11 determined by engagement of fingers 105 and 107 with the upper ends of slots 27, 27a and 29, 29a. In this retracted position of the lever, the pallet 97 is clear of the wheel. On clockwise swing of the lever, pallet 97 swings down between two teeth of the wheel. The lever has an arm 111 engageable with the pawl 83 to release the latter when the lever swings down from its FIG. 11 retracted position (see FIG. 12). The arrangement is such that when the lever swings down to enter pallet 97 between two teeth of wheel 61 and to release the pawl 83 (thereby permitting the wheel to escape clockwise under the bias of spring 79), the wheel escapes forward (clockwise) half the tooth spacing and then, when the lever is returned upward (counterclockwise) to its retracted position by the hairspring 109, the wheel escapes another half-tooth spacing. Thus, on a downward swing of the trip wires 101, 103 and a return upward swing thereof, the wheel escapes forward (clockwise) one tooth spacing, referred to as a one-step escape of the wheel.

Downward swing of the trip wires occurs in response to passage of a nickel through the nickel chute passage NC1 or a dime through the dime chute passage DC1. A nickel passing down through passage NC1 engages the finger 105 on the end of the upper trip wire 101, swings this wire down, and then passes on by to release the wire 101 to swing back upward. This effects a one-step escape of the escapement wheel 61. A dime passing down through passage DC1 engages the finger 105 on the end of the upper trip wire 101, swings this down, then passes on by to release wire 101 to swing upward, effecting a one-step escape of wheel 61, then engages the finger 107 on the end of the lower trip wire 103, swings this down, then passes on by to release wire 103 to swing upward, effecting a second one-step escape of the wheel 61. Thus, the effect of passage of a dime through passage DC1 is a two-step escape of the wheel.

Figure 13:
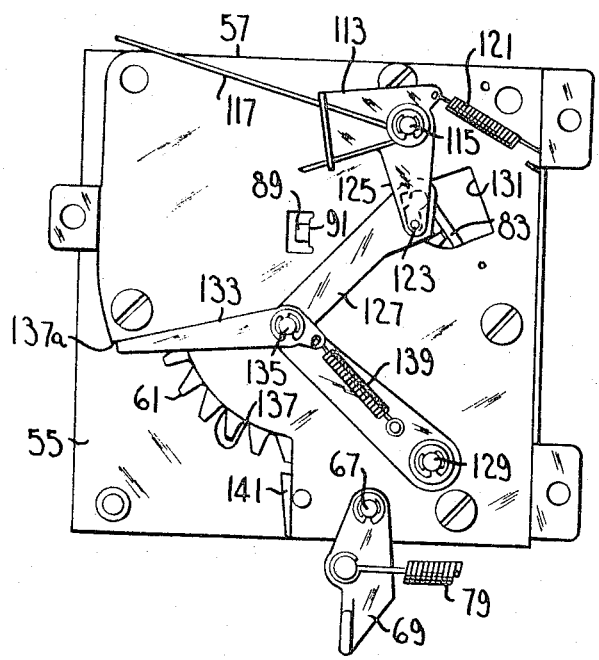
FIG. 13 is a rear elevation of FIG. 11, as viewed on line 13—13 of FIG. 5.

A lever 113 is pivoted at 115 on the back of plate 57 (see FIG. 13). A trip wire 117 extends to the right from this lever in back of the coin chute assembly and has a finger 119 at its right end which reaches through slot 51 across the quarter chute QC. A spring 121 biases lever 113 and wire 117 to rotate counterclockwise as viewed from the front (clockwise as viewed from the rear in FIG. 13) to a raised retracted position determined by engagement of finger 119 on the wire with the upper end of slot 51. Lever 113 carries a pin 123 which extends through a slot 125 in one end of an L-shaped lever 127 pivoted at its other end as indicated at 129 on the back of plate 57. The pin 123 extends forward through an opening 131 in plate 57 in front of the pawl 83. An escapement arm 133 is pivoted at 135 at the knee of lever 127 and extends therefrom toward the left as viewed from the rear in FIG. 13. At its free end, arm 133 has a finger 135 reaching forward through an arcuate notch 137 in plate 57. A spring 139 attached at one end to lever 127 and at its other end to the arm 133 biases the arm to swing upward on its pivot 135 on lever 127. The parts normally occupy the position shown in FIGS. 11–13 wherein finger 135 is clear of the escapement wheel 61 and engages the upper edge 137a of notch 137.

A quarter passing down through the quarter chute QC engages finger 119 on the end of trip wire 117, swings this wire down, and then passes on by to release the wire to swing back upward. Lever 113, swinging counterclockwise as viewed in FIG. 13 when wire 117 swings down, swings lever 127 clockwise as viewed in FIG. 13. This pulls the escapement arm 133 inward toward the wheel 61 to cause the finger 135 on the end of the escapement arm 133 to engage between two teeth of the escapement wheel. Also, via pin 123, it releases the pawl 83. The escapement wheel is thereupon rotated forward (clockwise as viewed in FIG. 11) under the bias of spring 79. With finger 135 on arm 133 engaged between two teeth of the escapement wheel, arm 133 is swung downward on its pivot. This continues until finger 135 strikes a stop 141 at the lower end of notch 137, this stop being located to stop the finger and the wheel after a five-step escape of the wheel. At this point, wire 117 being released to swing back upward, lever 113 swings back clockwise as viewed in FIG. 13, and pin 123 on lever 113 acts on lever 127 to shift arm 133 to move finger 135 outward clear of the wheel. This permits arm 133 to swing back upward to its retracted position of FIGS. 11–13 wherein the finger 135 engages the upper end 137a of the notch 137. The effect of this is to release pawl 83 for latching engagement with the wheel.

Figure 2:
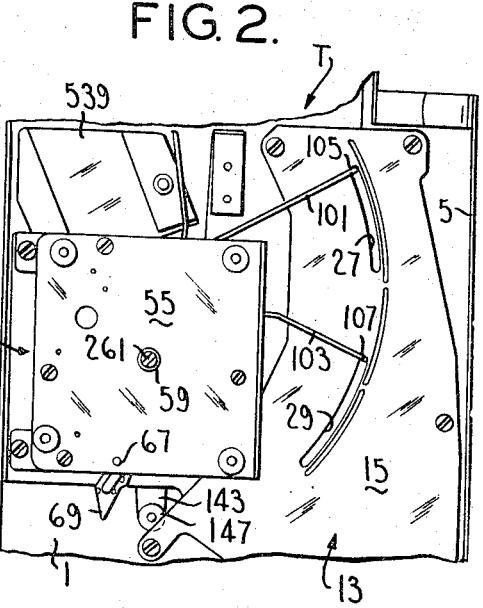
FIG. 2 is a fragment of FIG. 1 with the totalizer switch removed.
Figure 11:
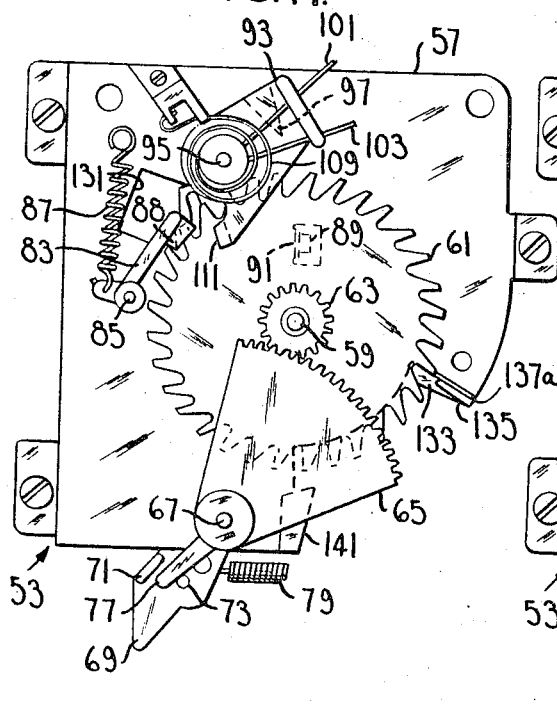
FIG. 11 is an enlarged fragment of FIG. 2 with a front plate of a totalizer escapement mechanism of the apparatus removed.
Figure 12:
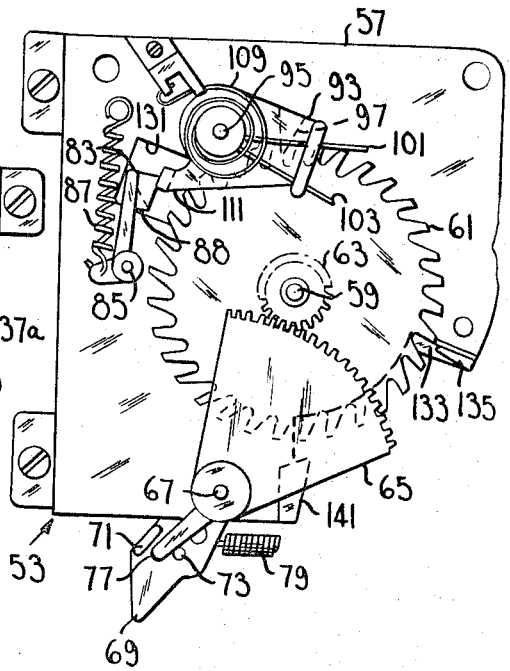
FIG. 12 is a view similar to FIG. 11 showing a moved position of parts.

Means for resetting the escapement wheel 61 to its zero position, determined by engagement of projection 89 on the wheel with stop 91, is shown in FIG. 17 to comprise a lever 143 pivoted at 145 on the main plate 1 and carrying a reset roller 147 engageable with the lever 69 (see also FIG. 2). Also pivoted at 145 is a bell crank 149, one arm 151 of which has a finger 153 at its free end projecting through a slot 155 in lever 143 and the other arm 157 of which has a pin 159 projecting through an arcuate slot 161 in the main plate 1 to the back of the latter. A spring 163 interconnects arm 157 of the bell crank 149 and lever 143, biasing lever 143 clockwise relative to the bell crank to the point where the right-hand end of slot 155 engages finger 153 as viewed in FIG. 17.

A spring 164 biases the assembly of lever 143 and bell crank 149 to rotate counterclockwise on pivot 145 to a retracted position wherein pin 159 is at the lower end of slot 161. A lever 165 (see FIG. 3) is pivoted at 167 on the back of plate 1. A link 169 interconnects the free end of lever 165 and arm 157 of bell crank 149 via pin 159. Lever 165 carries a cam follower roller 171 which engages a cam 173 formed on the back of a gear 175 fixed on the output shaft 177 of an electric motor 179 (a gearmotor). Gear 175 is in mesh with a gear 181 on a shaft 183.

As will appear, motor 179 is energized for reset purposes to drive shaft 177 and gear 175 counterclockwise as viewed from the back of plate 1 in FIG. 3 through a single revolution. Cam 173 on the back of gear 175 has a lobe for effecting an upward swing and then a downward return swing of lever 165 on each revolution of the cam. On upward swing of lever 165, lever 143, carrying reset roller 147, swings clockwise as viewed from the front in FIG. 1. On such clockwise swing of lever 143, roller 147 is adapted to swing lever 69 to the left, rotating sector gear 65 in clockwise direction as viewed in FIGS. 11 and 12, and the sector gear 65 thereupon rotates the escapement wheel 61 counterclockwise to its zero position (determined by engagement of projection 89 on the wheel with fixed stop 91). The escapement wheel becomes latched in its zero position by the pawl 83. On downward return swing of lever 165, lever 143 swings back to its retracted position.

Pin 33 is carried by a lever 183 pivoted at 185 on the back of plate 17 of the coin chute assembly (see FIG. 10). Pin 45 is on a lever 187 pivoted at 189 on the mounting plate 25. This lever 187 has a follower roller 191 projecting rearward through an arcuate slot 193 in plate 25, and an edge portion 195 engageable with a pin 197 on lever 183. A spring 199 connected to lever 183 biases it normally to maintain pin 33 at the inner end of notch 32, and a spring 201 connected to lever 187 biases it to rotate counterclockwise as viewed from the front in FIG. 17 to a position wherein pin 45 is at the right end of slot 43 in the path of a dime in dime chute passage DC2. When lever 187 is in said position, lever 183 occupies a position wherein pin 33 is at the right end of notch 32 in the path of nickels in nickel chute passage NC2 (see FIG. 7).

Means for moving the pins 33 and 45 is shown to comprise a lever 203 pivoted at 205 on the front of main plate 1 having an edge portion 207 engageable with roller 191 on lever 187. A link 209 is pin-connected at 211 to a crank pin on the gear 175 and is pin-connected at 213 to lever 203, the pin at 213 extending through an arcuate slot 215 in plate 1. The arrangement is such that, on rotation of gear 175 through a revolution, lever 203 is swung counterclockwise on its pivot 205 from its retracted position of FIGS. 17 and 18 and then swung back clockwise to its retracted position. As lever 203 swings counterclockwise, its edge 207, acting on roller 191, swings lever 187 counterclockwise as viewed from the front in FIGS. 17 and 18 to move pins 33 and 45 to the left and retract them from the nickel and dime chutes, and, as lever 203 returns clockwise, pins 33 and 45 return to the right to their chute-blocking position.

Nickels exiting from the lower end of passage NC2 of the nickel chute drop into a nickel change tube NT and dimes exiting from the lower end of passage DC2 of the dime chute drop into a dime change tube DT. The nickel and dime gates 37 and 49 are adapted to close whenever these change tubes are full, and to open when they are somewhat less than full. For this purpose, nickel gate 37 is formed as a tab on the upper end of a nickel feeler lever 219 pivoted on elongated pin 221 mounted in inclined position on the back of plate 19 of the coin chute assembly. This feeler lever has a finger 223 at its lower end adapted to feel into the upper end of the nickel tube via a slot 225 in the upper end of the nickel tube, and is biased to feel into the upper end of the nickel tube by a spring wire 227. Similarly, dime gate 49 is formed as a tab on the upper end of a dime feeler lever 229 pivoted on pin 221, this feeler lever having a finger 233 at its lower end adapted to feel into the upper end of the dime tube via a slot 235 in the upper end of the dime tube, and is biased to feel into the upper end of the dime tube by the spring wire 227. A lever 239 freely pivoted on the pin 221 has laterally extending arms 241 and 243 backing the feeler levers and a tab 245 at its upper end. This tab is normally engaged by a stud 247 extending forward from a feeler lockout lever 249 (see FIG. 17) pivoted at 251 in front of main plate 1 to hold the gates 37 and 49 in closed position in passages NC2 and DC2 (see FIGS. 10A and 10B). Lever 249 has a pin 253 extending forward into an arcuate notch 255 in lever 203, and is biased to rotate counterclockwise as viewed from the front by a spring 257, so that pin 253 is biased to engage the lower end of notch 255. The arrangement is such that, as lever 203 swings counterclockwise, lever 249 is let off to swing counterclockwise, and stud 247 disengages from the tab 245 to allow the gates 37 and 49 to open under the bias of spring wire 227. When lever 249 is returned to its normal position by lever 203 (stud 247 pushes in the tab 245 on lever 239 and the gates reclose.

From the above, it will appear that the first two nickels and the first dime deposited in the vending machine in conjunction with which the coin apparatus of this invention is used on any given purchase are initially retained in the coin chute assembly 13 by pins 33 and 45 (after having actuated the escapement mechanism 53). On reset, pins 33 and 45 are retracted to allow the retained nickels and dimes to drop down in passages NC2 and DC2. If the nickel and dime tubes NT and DT are not full, the gates 37 and 49 will be opened due to stud 247 on the feeler lockout lever 249 moving off the tab 245 of lever 239, allowing the feeler levers 219 and 229 to swing counterclockwise as viewed in FIGS. 10A and 10B to retract the gates, and enter feeler fingers 223 and 233 in the upper ends of the coin tubes. On retraction of the gates, the nickels drop down into the upper end of the nickel tube and the dime drops down into the upper end of the dime tube. On return of lever 249 to its normal reset position of FIGS. 17 and 18, the gates are returned to closed position and feeler fingers 223 and 233 are withdrawn from the upper ends of the nickel and dime tubes. If the nickel and dime tubes are full, gates 37 and 49 will remain closed in chute-blocking position, and the nickels will be diverted via cross-passage NC4 to drop out through passage NC3 and the dime will be diverted via cross-passage DC4 to drop out through passage DC3 (instead of being delivered to the tubes).

Mounted in front of the front plate 55 of the escapement mechanism 53 is a totalizer switch TS comprising printed circuit board 257 having certain fixed switch contacts printed thereon, and a rotor 259 constituting the movable member of the switch. This rotor, which like the board is made of electrical insulation material, is mounted for rotation in an opening 260 in the board on the axis of escapement wheel shaft 59. The shaft 59 has a key 26 on its forward end by means of which the rotor is keyed to the shaft to be rotated thereby. The contact pattern printed on the front face of the board includes five concentric conductive contact rings, centered in the axis of shaft 59 and rotor 259, these rings being designated R0, R5, R10, R15 and R20, R0 being the innermost ring and R20 being the outermost ring.

As will appear, R0 constitutes a zero change contact ring, R5 constitutes a 5¢ change contact ring, R10 constitutes a 10¢ change contact ring, R15 constitutes a 15¢ change contact ring, and R20 constitutes a 20¢ change contact ring. Surrounding the outermost ring R20 is a series of fixed contacts spaced at equal intervals around a circle concentric with the rings, and including a zero contact C0 and twenty-five contacts designated C5, C10, C15, C20, C25 . . . C125 representing prices in the series 5¢, 10¢, 15¢, 20¢, 25¢ . . . $1.25. The spacing of these contacts corresponds to the 5¢ steps of the escapement wheel 61 of the totalizer escapement mechanism 53. The rotor 259 has five separate electrically conductive wipers W1, W2, W3, W4 and W5 fixed thereto, which interconnect the outer series of contacts and rings R0, R5, R10, R15 and R20, respectively. FIG. 16 shows the construction of wiper W1. The other wipers are similar. The outer ends of the wipers are spaced at intervals corresponding to the spacing of contacts C0, C5, C10 etc., and the wipers are electrically insulated from one another. Printed conductors on the front of the board interconnect contacts C0, C5, C10 . . . C125 to terminals T0, T5, T10 . . . T125, respectively. There are two T0 terminals, specially designated T01 and T02. Terminals T01 and T5–T125 are plug-in terminals. A printed conductor PC20 on the front of the board interconnects outer continuous ring R20 and a terminal TR1. Printed conductors PC0, PC5, PC10 and PC15 on the back of the board interconnect rings R0, R5, R10 and R15, respectively, to terminals TR2–TR5 via conductive rivets extending through the board.

The rotor 259 of the totalizer switch TS is shown in FIGS. 1 and 14 in its zero position corresponding to the zero position of escapement wheel 61. In this zero position, the outer end of the first wiper W1 is on the C0 contact, one 5¢ interval back of the 5¢ price contact C5. The outer ends of the second, third, fourth and fifth wipers W2, W3, W4 and W5 are respectively spaced two, three, four and five 5¢ intervals back of the 5¢ price contact C5. On a one-step advance of the escapement wheel 61 and rotor 259 (which is keyed to the escapement wheel shaft 59), the outer end of wiper W1 advances into engagement with the 5¢ price contact C5; on a two-step advance of wheel 61 and rotor 259, the outer end of wiper W1 advances into engagement with the 10¢ price contact C10; etc. In other words, rotor 259 rotates clockwise as viewed in FIG. 14 away from its zero position in response to deposit of coin a number of intervals or steps corresponding to the amount deposited thereby to advance the first wiper W1 into engagement with the price contact representing the amount deposited and to bring the second, third, fourth and fifth wipers W2, W3, W4 and W5 into engagement with the price contacts representing 5¢, 10¢, 15¢ and 20¢ less than the amount deposited.

The nickel and dime tubes NT and DT extend upward from a base 271, constituted by a metal casting formed to provide a socket 273 for the nickel tube and a socket 275 for the dime tube. Socket 273 has an annular shoulder 277, and socket 275 has an annular shoulder 279. The lower end of the nickel tube bears on shoulder 277; the lower end of the dime tube bears on shoulder 279. The socket 273 and the nickel tube are adapted to support a stack of nickels to be issued in change normally supported on a nickel ejector slide 281. The nickel ejector slide is retractable to allow the stack to drop down onto a shelf 283 bottoming the slide and is then movable forward so that the forward end of the slide pushes forward the lowermost nickel of the stack resting on the shelt to dispense the lowermost nickel. The nickel ejector slide has a roller 285 extending downward therefrom through an elongate slot 287 in the base. The socket 275 and the dime tube DT are adapted to support a stack of dimes to be issued in change normally supported on a dime ejector slide 291. The dime ejector slide is retractable to allow the stack of dimes to drop down onto a shelf 293 bottoming the slide and is then movable forward so that the forward end of the slide pushes forward the lowermost dime of the stack resting on the shelf to dispense the lowermost dime. The dime ejector slide has a roller 295 extending downward therefrom through an elongate slot 297 in the base. A spring 299 connected to the pin for this roller biases the dime ejector to slide forward.

An electric motor 301 (a gearmotor) is provided for driving the nickel slide 281. Its output shaft, which extends vertically, is designated 303. On the lower end of this shaft (which rotates clockwise as viewed from above) is fastener a cam 305 having a notch 307. Fastened to the bottom of the cam is a crank 309. A link 311 interconnects the crank and a lever 313 pivoted at 315 on the base 271. Lever 313 has a pin and slot connection at 317 with the nickel slide 281. This arrangement is such that, on a revolution of shaft 303, the nickel slide is moved back and then forward to eject a nickel.

A holding switch 319 for the ejector drive motor 301 is provided on the bottom of the motor. This is actuated by an arm 321 on a lever 323 pivoted at 325 on the bottom of the motor having a cam follower roller 327 engaging the periphery of cam 305. Arm 321 engages the button of holding switch 319 and the inherent bias of the switch holds roller 327 against the cam. The function of the holding switch is to hold motor 301 energized either for one revolution of shaft 303 for ejection of one nickel or for two revolutions of shaft 303 for ejection of two nickels. The motor is deenergized when roller 327 drops into the notch 307 in the cam.

Means is provided for holding roller 327 from dropping into the notch in the cam after one revolution of shaft 303 and the cam to hold the motor energized for a second revolution of the shaft to eject a second nickel. This comprises a lever 329 pivoted at 331 on the gear housing 333 of motor 301 having an upper arm 335 above the housing and a lower arm 337 below the housing. The lower arm has a roller-blocking nose 339 at its free end. This lever normally occupies the retracted position in which it appears in FIGS. 25 and 27, in which nose 339 is clear of roller 327. It is biased by a spring 341 to swing clockwise as viewed from above to a position wherein nose 339 is engageable by roller 327 to block it from dropping into the notch in the can (see FIG. 28). It is normally latched in its retracted position by engagement of its upper arm 335 with a stud 343 extending down from a latch 345 (see FIGS. 6, 24 and 25). This latch is constituted by a two-tooth sector-shaped ratchet member, the two teeth of which are designated 347 and 349. It is pivoted at 351 on a plate 353 which overlies the upper arm 335 of lever 329. The stud 343 extends down from the ratchet member through an arcuate slot 355 in the plate. The ratchet member is biased by a spring 356 to rotate clockwise as viewed from above to a retracted position (see FIG. 26) freeing lever 329 to swing clockwise as viewed from above to bring nose 339 on the lower arm 337 into roller-blocking position (see FIG. 28). The ratchet member is normally held in its latching position of FIG. 6 by a pawl 357 pivoted at 359 on plate 353 biased toward engagement with the ratchet member by a spring 361. A solenoid 363 mounted on plate 353 has its plunger 365 connected to the pawl for release of the pawl on energization of the solenoid.

The pawl is normally engaged with the first tooth 347 of the ratchet member to hold the latter in its latching position of FIG. 6. When the solenoid 363 relases the pawl, the ratchet member is released to rotate clockwise as viewed in FIG. 6 under the bias of spring 356 to its retracted position, determined by engagement of a second stud 367 extending down from the ratchet member through slot 355 with the end 369 of this slot (see FIG. 26), thereby freeing the upper arm of lever 329 to permit this lever to swing clockwise to bring the nose 339 on its lower arm into roller-blocking position (see FIG. 28). The second tooth 349 moves completely past the tip of the pawl. Means for resetting the ratchet member is shown to comprise a pin 371 projecting radially from the upper end of shaft 303. On the first revolution of shaft 303 after release of the ratchet member, pin 371 engages stud 343 on the ratchet member to step it back one tooth interval (i.e., the pawl interengages with the second tooth 349 of the ratchet member), and on the second revolution of the ratchet member, pin 371 engages stud 367 on the ratchet member to step it back another tooth interval and the pawl interengages with the first tooth 347 of the ratchet member, thereby resetting it in its normal position of FIG. 6.

The ejector motor 301 is also used to power the dime ejector slide 291 via a disengageable coupling arrangement as between the nickel ejector slide 281 and the dime ejector slide. This arrangement includes a hook 373 (see FIG. 19) pivoted at 375 on the lever 313 and biased by a spring 376 to rotate counterclockwise on its pivot 375 to a retracted position determined by engagement of a tail 377 on the hook with a collar 378 on the pivotal connection between link 311 and lever 313. A wire 379 projects laterally from the hook. A solenoid 381 (see FIG. 24) is mounted in vertical position just to the right of the motor gear housing 333. The plunger 383 of this solenoid is biased upward by a spring 384, and is adapted to move downward when the solenoid is energized. A pin 385 extends downward from the plunger. The solenoid is so positioned that, when it is energized and its plunger moves downward, pin 385 is disposed in back of the wire 379 for camming the hook clockwise on its pivot 375 and causing it to hook on to a pin 387 extending upward from the dime ejector slide 291. As long as the solenoid is deenergized, pin 385 lies retracted above and clear of the wire, and, under these circumstances, on counterclockwise swing of lever 313 to move the nickel ejector slide 281, the hook 373 swings back with lever 313 clear of the pin 387 (i.e., the tip of the hook swings in an arc centered in pivot 315 and clears the pin 387). However, when pin 385 is moved down in back of wire 379 on energization of solenoid 381, and on counterclockwise swing of lever 313, pin 385 keeps the hook in position to hook onto pin 387, with resultant actuation of the dime ejector slide.

From the above, it will appear that for dispensing one nickel in change, ejector motor 301 is energized for one revolution of shaft 303 to act via link 311 and lever 313 to retract the nickel ejector slide 281 and then push it back forward to eject one nickel. For dispensing a second nickel in change, motor 301 is held in operation for a second actuation of the nickel ejector slide by the energization of solenoid 363 to release the ratchet-toothed latch 345 to allow nose 339 on the lower arm of lever 329 to act via lever 323 and its arm 321 to maintain holding switch 319 actuated for a second revolution of the shaft 303. For dispensing a dime in change along with a nickel, solenoid 381 is energized to cause hook 373 to actuate the dime ejector slide 291 on actuation of the nickel ejector slide 281.

Nickels, dimes and quarters exiting from the lower end of passage NC3 of the nickel chute, the lower end of the passage DC3 of the dime chute and the lower end of quarter chute QC drop into what is referred to as an escrow unit designated in its entirety by the reference numeral 391, located at the lower right of the apparatus, and shown in FIGS. 1, 4, 6, 20 and 21. This comprises a body constituted by a casting 393 having a side wall 395, a front wall 397 extending the full height of the side wall, an upper rear wall section 399 extending about half the height of the left side wall and a lower rear wall section 401 offset rearward from the upper rear wall section. A removable right side wall for the escrow unit is indicated at 402 in FIG. 6. FIGS. 4 and 21 show this removed. The upper part of wall 395 and the upper rear wall section 399 define a vertical coin chute 403, the upper end of which is disposed directly below the lower ends of passages NC3 and DC3 and the quarter chute. Coins dropping into chute 403 initially come to rest in escrow on a trap door 405 pivoted at 407 at one side of chute 403 and normally extending across the chute 403. This trap door is adapted to swing down (counterclockwise as viewed in FIGS. 4 and 21) on its pivot 407 to release the escrowed coins.

A coin deflector 409 is pivoted at 411 adjacent the bottom of the escrow unit in the plane of wall section 399. This deflector normally extends vertically upward from pivot 411 as shown in FIG. 21 to the bottom of wall section 399. When the deflector is in its said normal vertical position, coins released by the escrow door 405 drop straight down on the left side of the deflector, exit from the escrow unit, and are delivered to a money box (not shown). The deflector is swingable to the left on its pivot (counterclockwise as viewed in FIG. 21) to the position shown in FIG. 4 for deflecting coins released from escrow to the right for return to a customer via a suitable coin return chute arrangement (not shown).

The escrow door 405 has a pin 413 extending through an arcuate slot 415 in the wall 395 to the outside of the latter, for actuation of the door by a lever 417 (see FIG. 20). This lever is pivoted at 419 on the outside of wall 395 and has a cam groove formation 421 on the back of its upper end for camming the pin 413. It normally occupies the position shown in FIG. 20 holding the escrow door closed (i.e., in the angled position extending across chute 403 shown in FIG. 21). Lever 417 is swingable counterclockwise away from its FIG. 20 position to swing the escrow door down and release coins to fall down through chute 403, being actuated by a link 423 pin-connected at 425 to the lever 203 (see FIG. 17) and having a pin and slot connection at 427 with lever 417.

The deflector 409 has a pin 429 extending through an arcuate slot 431 in wall 395 to the outside of the latter. This pin is received in a notch 433 in a lever 435 pivoted at 437 on the outside of wall 395. A spring 439 biases lever 435 to rotate clockwise toward a stop 441 on wall 395. Lever 435 is normally held in the position shown in FIG. 20, in which it holds the deflector 409 in vertical postion, by a latch 443 pivoted at 445 on the outside of wall 395 and biased toward latching engagement with lever 435 by a spring 447. A solenoid 449 has its plunger 451 connected to the latch 443. The arrangement is such that when the solenoid 449 is energized, the latch is released, and the lever 435 swings over against the stop 441, resulting in swinging of the deflector 409 from its vertical position of FIG. 21 to its coin-deflecting coin-return position of FIG. 4.

A reset arm 453 is provided on lever 417 for returning lever 435 back to its latched position of FIG. 20. This arm is pivoted at 455 on lever 417 and is biased against a stop 456 on lever 417 by a spring 457. It has a roller 459 at its lower end engageable with a lug 461 on lever 435 when lever 417 returns to its normal position for swinging lever 435 counterclockwise back to its FIG. 20 position, whereupon latch 443 drops in to latch lever 435 in its FIG. 20 position. As lever 417 completes its return movement, roller 459 clicks by the lug 461 back to its FIG. 20 position. Lever 435 has a lower arm 463. A wire 465 is connected at one end as indicated at 467 to this arm, its other end being hooked as indicated at 469 in a slot 471 in lever 249 to have a lost motion connection with the latter (see FIG. 17). A switch 473 is mounted on the outside of wall 395, its operating arm 475 being connected to lever 435 for actuation by the latter. This switch is referred to as the escrow cancel switch.

At the upper left of the coin apparatus is a coin return bar 477 (see FIG. 1) for actuation to cancel a purchase and obtain the return of a deposited coin or coins. This bar is mounted for vertical sliding movement on a plate 479 in front of plate 1. A spring 481 biases bar 477 upward to retracted position. A switch 483 mounted on the front of plate 479 has the roller 485 on its operating arm 487 in the path of a cam edge 489 on the bar 477 for actuation of the switch on downward movement of the bar. This switch is referred to as the upper cancel switch. A switch 491 is mounted on the front of plate 479. This switch, referred to as the lower cancel switch, has an operating button 493 engageable by an arm 495 on a lever 497 pivoted at 499 on the front of plate 479. Lever 497 is biased counterclockwise by a spring 501 to a retracted position against a stop 503. A disk 505 is pivoted at 507 on lever 497. This disk has a peripheral notch 509 receiving a pin 511 extending forward from lever 497. A spring 513 biases the disk to rotate counterclockwise on its pivot 507 to a retracted position determined by engagement of the left end of the notch 509 with the pin 511. The disk carries a roller at 515 in the path of a cam edge 517 on the coin return bar 477. A wire 519 has its lower end connected at 521 to lever 143 (see FIG. 17) and its upper end hooked in an arcuate slot 523 in disk 505 (see FIG. 1).

When the coin return bar 477 is pushed downward to cancel a purchase and effect the return of deposited coins (as will be more fully described), cam edge 489 on the bar actuates switch 483, and then (after actuation of switch 483) cam edge 517 on the bar engages roller 515 on disk 505 to swing the lever 497 counterclockwise so that arm 495 on this lever 497 pushes in the button 493 of switch 491. The upper end of wire 519 simply idles in slot 523 at this time. This triggers the operation of reset motor 179 (as will be more fully described), resulting in clockwise swing and counterclockwise return of lever 143. Generally, the bar 477 will be immediately released, so that both switches 483 and 491 are immediately deactuated. If, however, the coin return bar 477 should be held down during the reset cycle, switch 491 is automatically deactuated as a result of wire 519 being pulled down by the lever 143, resulting in clockwise rotation of disk 505 to rotate lever 497 clockwise and back off arm 495 from the push button of switch 491 to deactuate the latter.

The effect of actuating switches 483 and 493 by pushing down the coin return bar 477, as will appear more fully from the circuit diagram shown in FIG. 29, is to start the reset motor 179 for a reset cycle and to energize the escrow solenoid 449 to release escrow latch 443 to permit lever 435 to swing deflector 409 to its coin-deflecting position of FIG. 4 for return to the customer of escrowed coins. The reset mechanism acts via lever 203 and link 423 to swing lever 417 counterclockwise away from its FIG. 20 position and then clockwise back to its FIG. 20 to open and close the escrow door 405. Escrowed coins released on opening of door 405 drop down, and are diverted by the deflector 409 (in its FIG. 4 position) for return to the customer.

Noting that the first nickel deposited by a customer, and the second nickel and dime, if any, deposited by a customer are initially retained in the coin chute assembly 13 by pins 33 and 45, it will be observed that, on operation of the reset mechanism in response to pushing down the coin return bar 477, pins 33 and 45 are retracted for return of these coins to the customer. This results from actuation on reset of levers 203, 187 and 183 thereby to retract the pins 33 and 45. Gates 37 and 49 remain closed for diversion of coins released from pins 33 and 45 to passages NC3 and DC3, from which the coins drop into and through the escrow unit 391 for return to the customer (deflector 409 being in its FIG. 4 coin return position). These gates are held closed by the action of wire 465 to hold feeler lockout lever 249 against movement away from its gate-closing FIG. 17 position on release of lever 435. Reset of lever 435 (i.e., return of this lever to its latched rest position shown in FIG. 20) occurs on the return reset movement of lever 417 to its FIG. 20 escrow-door-closed position. This results from engagement of roller 459 on reset arm 453 of lever 417 with the right-hand side of lug 461 on lever 435 to drive lever 435 back to its rest position, the lug clicking by the roller in the final phase of this return movement of lever 435.

A switch 525, which is referred to as the sample switch, is mounted on the back of main plate 1 (see FIG. 3). This has an operating arm operable by a cam 527 on the back of gear 181. Two switches 529 and 531 (see FIGS. 17 and 29) are mounted one behind the other in front of plate 1 and have operating arms operable by a cam 533 on shaft 183 of gear 181. Switch 529 is referred to as the reset motor control switch and switch 531 is refered to as the auxiliary switch. A coin return electromagnet 535 is mounted on the front of plate 1 and operates a conventional gate 537 for diverting coins out of the coin acceptor and slug rejector (not shown) for return to the customer via coin return chutes 539 (see FIGS. 1 and 5) and 541 (see FIGS. 3 and 5). Chute 541 leads to the back of the escrow unit for return of coins via the back of the escrow unit (on the right side of deflector 409 as viewed in FIG. 21).

Means is provided for detecting emptying of the nickel tube NT and the dime tube DT. As shown best in FIG. 23, this means for the nickel tube comprises a nickel tube empty switch 545 having its operating arm 547 biased to swing through a slot in socket 273 for the nickel tube into contact with the stack of nickels. Normally, this arm is held out in its FIG. 23 position as long as there are some nickels in the nickel change supply for making change, but when the supply is depleted the arm 547 swings in to actuate the switch 545. Similarly, this means for the dime tube, as shown best in FIG. 22, comprises a dime tube empty switch 549 having its operating arm 551 biased through a slot in socket 275 for the dime tube into contact with the stack of dimes. Normally, this arm 551 is held out in its FIG. 22 position as long as there are some dimes in the dime change supply, but when the supply is depleted the arm 551 swings in to actuate the switch 549.

As herein illustrated, the coin apparatus is wired for handling vending of 5¢, 10¢, 15¢, 20¢ and 25¢ items from a vending machine of a type having push button switches operable by purchasers for the vending of items of these five prices. It will be understood, however, that it may be wired for handling items of other prices within the 5¢-$1.25 range of the totalizer unit T, and for handling more or less than five different prices. As shown in FIG. 29, a fourteen-terminal plug P is provided for plugging into a fourteen-socket receptacle of the wiring of the dispensing mechanism of the vending machine. The terminals of this plug are designated P1–P14. Terminals P1–P5 may be referred to as 5¢, 10¢, 15¢, 20¢ and 25¢ price terminals and are interconnected respectively with the 5¢, 10¢, 15¢, 20¢ and 25¢ push button switches (not shown) of the vending machine. These five price terminals are respectively interconnected with terminals T5–T25 and hence with price contacts C5–C25 of the printed circuit board 257 by lines L1–L5 (removably plugged into terminals T5–T25). The arrangement is such that when a 5¢ push button switch of the vending machine is actuated by a purchaser, line L1 is energized to energize the 5¢ contact C5 of the circuit board 257; when a 10¢ push button switch of the vending machine is actuated by aa purchaser, line L2 is energized to energize the 10¢ contact C10; etc.

The first wiper W1 is interconnected with terminal P14 of plug P via the zero change ring R0, the printed conductor PC0, terminal TR2 and a line L6. This circuit, referred to as the L6 circuit, constitutes a vend circuit, being interconnected via terminal P14 of plug P with a vending control (e.g., a vend relay) in the vending machine, the arrangement being such as to permit a vend cycle whenever this circuit is energized.

Referring to FIG. 30, there is shown a relay RA (contained in a box 543 on back of plate 1 as shown in FIG. 3). This relay has four double-throw relay switches RA1, RA2, RA3 and RA4 controlled by relay coil RAC. These switches are normally closed on their top contacts as shown in FIG. 30 and close on their lower contacts when coil RAC is energized. The second wiper W2 is connected to the center terminal of switch RA1 via ring R5, terminal TR3 and a line L7. The third wiper W3 is connected to the center terminal of switch RA2 via ring R10, terminal TR4 and a line L8. The fourth wiper W4 is connected to the center terminal of switch RA3 via ring R15, terminal TR5 and a line L9. The fifth wiper W5 is connected to the center terminal of switch RA4 via ring R20, terminal TR1 and a line L10. The top contacts of switches RA1–RA4 are interconnected with one another and connected to the vend circuit L6 as indicated at L11. This arrangement is such that, whenever any one of lines L7–L10 is energized, and with relay coil RAC initially deenergized so that switches RA1–RA4 are closed on their top contacts, the vend circuit L6 is energized via line L11.

Three other relays RB, RC and RD are housed in box 543. Relay RB has two single-throw relay switches RB1 and RB2 and two coils RBC1 and RBC2, with a common center terminal, for these coils. Switches RB1 and RB2 are normally open and are pulled down to close when either of coils RBC1 or RBC2 is energized. Relay RC has two single-throw relay switches RC1 and RC2 and two coils RCC1 and RCC2, with a common center terminal for the coils. Switches RC1 and RC2 are normally open and are pulled down to close when either of coils RCC1 or RCC2 is energized. Relay RD has one single-throw relay switch RD1 and a single coil RDC. Switch RD1 is normally open and is pulled down to close when coil RDC is energized. As will appear, relays RA, RB, RC and RD constitute control means for the ejector motor 301, the second nickel solenoid 363 and the dime solenoid, setting up a first circuit including relay RD energized via connection L7 for actuating the ejector motor to deliver a nickel in change, a second circuit including relay RC energized via line L8 for energizing the second nickel solenoid 363 and the ejector motor 301 for delivering two nickels in change, a third circuit including relay RB energized via line L9 for energizing the dime solenoid 381 and the ejector motor 301 for delivering a nickel and a dime in change, and a fourth circuit including relays RB and RC energized via line L10 for energizing the second nickel solenoid 363, the dime solenoid 381 and the ejector motor 301 for delivering two nickels and a dime in change.

The sample switch 525 is a double-throw switch normally closed on its upper contact and throw to close on its lower contact in the course of rotation of cam 527 by the reset motor 179. It controls coil RAC of relay RA, this coil being connected in a line L12 between a power source PS and the lower contact of the sample switch. The center terminal of the sample switch is connected to ground via a line L13 leading to a grounded terminal GT. This circuitry is such that whenever the sample switch closes on its lower contact, coil RAC is energized from the power source PS via L12 and L13 to pull down the relay switches RA1–RA4. As is apparent, this occurs in the course of a reset cycle.

The reset motor 179 is connected in a circuit L14 between terminal P12 of plug P and the grounded terminal GT. Power is supplied to terminal P12 in conventional manner under control of the dispensing mechanism of the vending machine when the dispensing mechanism is set into operation, thereby to energize circuit L14 and start the reset motor in response to operation of the dispensing mechanism. The reset motor is held in operation for a single revolution of cam 527 by the action of reset motor control switch 529. This is a normally closed single-throw switch connected in a series circuit L15 with the escrow switch 473 (which is a normally closed switch) between terminals P8 and P9 of plug P. Terminal P9 is connected to a power source in the vending machine so that circuit L15 is normally energized. Terminal P8 is connected to a control in the vending machine for the reset motor circuit L14 such that the reset motor 179 is deenergized when switch 529 closes. The arrangement is such that the reset motor is started in response to operation of the dispensing mechanism in the vending machine, then held in operation for a single revolution of cam 533 (and cam 527) by action of cam 533 to open switch 529 and hold it open for a revolution of cam 533. The coin return electromagnet 535 is connected in series with switches 473 and 529 by a connection L16 between circuit L15 and ground terminal GT. Thus, with the motor switch 529 and the escrow switch 473 normally closed, the electromagnet 535 is normally energized to hold the gate 537 in retracted position for acceptance of coins. When switch 529 is opened during a reset cycle, the electromagnet is deenergized to throw the gate 537 into closed position and divert coins deposited during a reset cycle back to the customer via chutes 539 and 541. It is also deenergized to throw the gate 537 closed whenever power is off.

The auxiliary switch 531 is a double-throw switch having its upper contact connected as indicated at L17 to terminal P6, its lower contact connected as indicated at L18 to terminal P7 and its center terminal connected as indicated at L19 to the ground terminal GT. Its function is to send a signal back to the dispensing mechanism that the coin apparatus is working, by closing on its upper contact when reset motor is set into operation. It may serve as an anti-jackpot means, or for other purposes, depending on the nature of the dispensing mechanism.

The nickel tube and dime tube empty switches 545 and 549 are double-throw switches. They have their upper contacts interconnected to line L12 as indicated at L20 and L21. The center terminal of the nickel tube empty switch 545 is interconnected with the lower contact of the time tube empty switch 549 as indicated at L22. The center terminal of the dime tube empty switch 549 is grounded via a line L23 connected to the ground terminal GT. A manual double-throw switch, which is referred to as the no-change switch, is indicated at 553. The lower contact of the nickel tube empty switch 545 is interconnected with the center terminal of switch 553 as indicated at L24. The lower contact of switch 553 is interconnected as indicated at L25 with the center terminals of the coils of relays RB and RC and the lower terminal of coil RDC of relay RD. The upper contact of switch 553 is connected as indicated at L26 with line L12. A lamp 555 constituting an indicator for indicating that exact amounts in change are to be deposited for making purchases is connected between the power source PS and the junction of lines L12 and L26 as indicated at L27.

Normally, for making change, switch 553 is thrown on its lower contact. For operation of the apparatus without making change (i.e., simply as a coin control for the vending machine), switch 553 is thrown on its upper contact. The effect of this is to disconnect line L25 from the circuit, which cuts off change-making relays RB, RC and RD, and to energize the lamp 555 to indicate that exact amounts are to be deposited.

Relay switches RB1, RC1 and RD1 control the start-up of ejector motor 301, being connected in parallel lines L28, L29 and L30 branching off from line L12 and feeding a circuit L31 for motor 301 which is connected via line L23 to the ground terminal GT. The arrangement is such that whenever any one of switches RB1, RC1 or RD1 is closed, the motor circuit 301 is energized from line L12 (powered from power source PS). Once motor 301 starts, it is held in operation by the action of holding switch 319. This switch is a double-throw switch normally closed on its lower contact, and thrown onto its upper contact by cam 305 once motor 301 has started. The center terminal of switch 319 is connected as indicated at L32 to the L31 side of the motor, and its upper contact is connected as indicated at L33 with line L12. The arrangement is such that when switch 319 is thrown onto its upper contact by cam 305, it completes a circuit for motor 301 from line L12 via L33, switch 319, L32 and L31 to ground, and it holds this until thrown back on its lower contact by cam 305 at the end of a revolution (or two revolutions) of cam 305. A so-called pay-out switch for actuation by a serviceman to eject coins from tubes NT and DT, as for inventory purposes, is indicated at 557. This is normally open as shown. When closed, it interconnects a line L34 connected to the lower terminal of switch 319 and line L33 to energize the ejector motor. It also interconnects line L33 to a line L35 which has the dime solenoid 381 connected therein in series and which is grounded to the ground terminal GT. The arrangement is such that, on manually closing the pay-out switch 557, motor 301 and the dime solenoid 381 are energized until switch 557 is opened, resulting in ejection of nickels from the nickel tube NT and dimes from the dime tube DT.

Relay switch RB2 controls the dime solenoid 381 and relay switch RC2 controls the second nickel solenoid 363. Switch RB2 is connected in series with the dime solenoid 381 in a circuit L36 fed by line L12 and connected to line L35. Switch RC2 is connected in series with the second nickel solenoid 363 in a circuit L37 fed by line L12 and grounded via connection to ground terminal GT.

Relay switch RA1 controls coil RDC of relay RD via a connection L38 between the lower contact of this switch and the upper terminal of coil RDC. When switch RA1 is closed on its lower contact, and power is supplied to the center terminal of switch RA1 (as occurs when a nickel is to be delivered in change), a circuit is completed for coil RDC via line L38, line L25, switch 553 (closed), line L24, switch 545 (closed on its lower contact as long as there is a supply of nickels for change in tube NT), line L22, switch 549 (closed on its lower contact as long as there is a supply of dimes in tube DT) and line L23. On energization of coil RDC, switch RD1 closes and this effects actuation of the ejector motor 301 to eject one nickel.

Relay switch RA2 controls coil RCC2 of relay RC via a connection L39 between the lower contact of this switch and the lower terminal of this coil. When switch RA2 is closed on its lower contact, and power is supplied to the center terminal of switch RA2 (as occurs when 10¢ is to be delivered in change), a circuit is completed for coil RCC2 via line L39, line L25, switch 553, etc. On energization of coil RCC2, switches RC1 and RC2 close and complete circuits for the ejector motor 301 and the second nickel solenoid 363 to eject two nickels.

Relay switch RA3 controls coil RBC2 of relay RB via a connection L40 between the lower contact of this switch and the lower terminal of this coil. When switch RA3 is closed on its lower contact, and power is supplied to the center terminal of switch RA3 (as occurs when 15¢ is to be delivered in change), a circuit is completed for coil RBC2 via line L40, line L25, switch 553, etc. On energization of coil RBC2, switches RB1 and RB2 close and complete circuits for the ejector motor 301 and the dime solenoid 381 to eject a nickel and a dime.

Relay switch RA4 controls coils RBC1 and RCC1 of relays RB and RC, having its lower contact interconnected as indicated at L41 with the upper terminals of these coils. When switch RA4 is closed on its lower contact, and power is supplied to the center terminal of switch RA4 (as occurs when 20¢ in change is to be delivered), a circuit is completed for both coils RBC1 and RCC1 via line L41, line L25, switch 553, etc. On energization of these coils, switches RB1, RB2, RC1 and RC2 close. This completes circuits for the ejector motor 301, the second nickel solenoid 363 and the dime solenoid 381 to eject two nickels and a dime.

The upper cancel switch 483 is a double-throw switch and the lower cancel switch is a single-throw switch. The upper contact of switch 483 is interconnected by a line L42 with terminal P10 of plug P and its center terminal is interconnected by a line L43 with terminal P11. The lower cancel switch 491 is connected in series with the escrow solenoid 449 in a line L43 between the lower contact of switch 483 and the upper contact of sample switch 525. Terminal P11 is a source of power, so that when switch 483 is closed on its lower contact and switch 491 is closed, and, with the sample switch 525 initially closed on its upper contact, the escrow solenoid 449 is energized to actuate the deflector 409 for coin return, with accompanying opening of escrow switch 473. Opening of the latter opens circuit L15 to energize the reset motor 179 for a reset cycle.

Operation is as follows:

With the apparatus set up as herein illustrated for handling the vending of 5¢, 10¢, 15¢, 20¢ and 25¢ items, the following situations may occur:

(A) A purchaser may deposit a nickel for purchase of a 5¢ item, in which case no change is to be returned.

(B) A purchaser may deposit a dime for purchase of a 5¢ item, in which case a nickel is to be delivered in change.

(C) A purchaser may deposit a quarter for purchase of a 5¢ item, in which case 20¢ (two nickels and a dime) are to be delivered in change.

(D) A purchaser may deposit a dime or two nickels for purchase of a 10¢ item, in which case no change is to be returned.

(E) A purchaser may deposit a quarter for purchase of a 10¢ item, in which case 15¢ (a nickel and a dime) is to be returned in change.

(F) A purchaser may deposit three nickels or a dime and a nickel for purchase of a 15¢ item, in which case no change is to be returned.

(G) A purchaser may deposit two dimes for purchase of a 15¢ item, in which case a nickel is to be delivered in change.

(H) A purchaser may deposit a quarter for purchase of a 15¢ item, in which case two nickels are to be delivered in change.

(I) A purchaser may deposit four nickels, two dimes or a dime and two nickels for purchase of a 20¢ item, in which case no change is to be delivered.

(J) A purchaser may deposit a quarter for purchase of a 20¢ item, in which case a nickel is to be delivered in change.

(K) A purchaser may deposit 25¢ in coin for purchase of a 25¢ item, in which case no change is to be delivered.

(L) A purchaser may deposit three dimes for purchase of a 25¢ item, in which case a nickel is to be returned in change.

(M) Either the nickel tube NT or the dime tube DT may be empty, or the no-change switch 553 may be thrown to no-change position, in which case vending of 5¢, 10¢, 15¢, 20¢ and 25¢ items may still be had upon deposit of exact amounts, as indicated by the "INSERT EXACT AMOUNT" lamp 555.

(N) A purchaser may wish to cancel a prospective purchase and obtain return of his deposited coin or coins.

On the deposit of a nickel in the vending machine in which the apparatus of this invention is used, the nickel first travels through the coin selector and slug rejector (not shown) which passes it into the nickel chute NC of the coin chute assembly 13. The nickel, falling in the upper passage NC1 the nickel chute, strikes the finger 105 on trip wire 101, and swings this wire down. This results in a one-step escape of the escapement wheel 61, as previously explained, with resultant clockwise rotation of rotor 259 from its zero position of FIGS. 14 and 29 through one step to a 5¢ registering position wherein the outer end of wiper W1 is on the 5¢ contact C5 of the circuit board 257. The nickel passes on by the finger 105, and is arrested in passage NC2 by the pin 33. On deposit of a second nickel, the escapement wheel 61 escapes another step, and rotor 259 is rotated further to a 10¢ registering position wherein the outer end of wiper W1 is on the 10¢ contact C10 of board 257, and the outer end of wiper W2 on the 5¢ contact C5. The second nickel is arrested in passage NC2 on top of the first nickel. Each of any nickels subsequently deposited effects further one-step escapes of wheel 61 and rotor 259, and is diverted into passage NC3, falling out of the lower end of this passage into the escrow unit 391, where it is held in escrow by the escrow door 405.

On the deposit of a dime, the dime first travels through the coin selector and slug rejector, which passes it into the dime chute DC. The dime, falling in passage DC1 of the dime chute, strikes the finger 105 on trip wire 101 and swings this wire down. This results in a one-step escape of wheel 61 and a one-step advance of rotor 259. The dime passes on by finger 105, and then strikes finger 107 on trip wire 103 to swing the latter wire down. This results in another one-step escape of wheel 61 and a one-step advance of rotor 259 to bring it to a 10¢ registering position wherein the outer end of wiper W1 is on 10¢ contact C10 and the outer end of wiper W2 is on the 5¢ contact C5. The dime passes on by the finger 107, strikes arm 39a of toggle 39, swinging the latter to its dotted line position of FIG. 8, and then is arrested in passage DC2 by the pin 45. Each dime subsequently deposited similarly effects a two-step advance of the rotor 259, and is diverted into passage DC3, falling out of the lower end of this passage into the escrow unit 391, where it is held in escrow by escrow door 405.

On the deposit of a quarter, the quarter first passes through the coin selector and slug rejector, which passes it into the quarter chute QC. The quarter, falling in the quarter chute, strikes the finger 119 on trip wire 117 and swings this wire down. This results in a five-step escape of wheel 61 and a five-step advance of the rotor 259 to a 25¢ registering position wherein the outer ends of wipers W1, W2, W3, W4 and W5 are on contacts C25, C20, C15, C10 and C5, respectively. The quarter passes on by the finger 117 and falls out of the lower end of the quarter chute into the escrow unit 391, where it is held in escrow by the escrow door 405.

It will be understood that coins may be deposited in any order, and the amount deposited will be totalized and registered by rotor 259. For example, on deposit of a nickel and a dime, rotor 259 will register 15¢ by advancing to a position wherein the outer ends of wipers W1, W2 and W3 are on contacts C15, C10 and C5, respectively, and on deposit of two dimes, or two nickels and a dime, rotor 259 will register 20¢ by advancing to a position wherein the outer ends of wipers W1, W2, W3 and W4 are on contacts C20, C15, C10 and C5, respectively.

Assuming that a purchaser has deposited a nickel for obtaining a 5¢ item (situation A), the nickel will have entered the nickel chute, effected a one-step (5¢) advance of rotor 259 and come to rest on pin 33 in the nickel chute passage NC2. Wiper W1 on the rotor electrically interconnects contact C5 of the printed circuit board 257 and the inner ring R0 (the zero change ring). When the purchaser pushes in a push button of the vending machine to obtain a 5¢ item, vend circuit L6 is energized from line L1 via contact C5, wiper W1, and ring R0 to energize the vend relay in the vending machine to effect the vending of a 5¢ item.

Upon initiation of the vending operation, reset motor 179 is energized via line L14. The circuit for the reset motor is held energized for a single revolution of the shaft 177 and cams 527 and 533 by the opening of motor switch 529 under the action of cam 533. Also, when switch 529 opens, the coin return electromagnet 535 is deenergized to throw the gate 537 into the coin selector and slug rejector so that, if another coin is inserted while the reset motor is in operation for reset purposes, the coin will be returned to the purchaser via chutes 539 and 541.

On rotation of the shaft 177 through a revolution, lever 165 on the back of the apparatus (see FIG. 3), moves up and then back down under the action of cam 173 on the back of gear 175. This moves link 169 up and then back down to swing levers 157 and 143 clockwise away from their FIG. 17 position against the bias of spring 164 and then counterclockwise under the bias of spring 164 back to their FIG. 17 position. As lever 143 swings clockwise, roller 147 on lever 143 engages lever 69 to swing the sector gear 65 of the escapement mechanism clockwise to reset the escapement wheel 61 and the rotor 259 back to zero.

Also, on rotation of shaft 177 through a revolution, link 209 connected to gear 175 on shaft 177 acts via the pin connection at 213 to swing lever 203 counterclockwise away from its retracted position of FIGS. 17 and 18 and then back to its retracted position. As lever 203 swings counterclockwise, it acts via roller 191 to swing lever 187 counterclockwise and lever 187 acts via pin 197 to swing lever 183 counterclockwise to retract the pin 33 from the nickel chute passage NC2 (also to retract the pin 45 from the dime chute passage DC2). Also, as lever 203 swings counterclockwise, it lets off lever 249 to swing counterclockwise with resultant disengagement of stud 247 on lever 249 from behind tab 245 on lever 239. This results in withdrawal of gate 37 from passage NC2 (and withdrawal of gate 49 from passage DC2). Accordingly, the nickel released from pin 33 falls down through passage NC2 and drops out of the lower end of passage NC2 into the nickel tube NT if this it not full. Upon clockwise return of levers 203 and 249 to their retracted position of FIGS. 17 and 18, stud 247 on lever 249 engages tab 245 and acts to reclose the gates 37 and 49 and to withdraw feeler fingers 223 and 233 from the upper ends of tubes NT and DT.

Thus, on deposit of a nickel for purchase of a 5¢ item, the nickel is initially maintained in the nickel chute passage NC2 and then, on initiation of the purchase, is passed to the nickel tube NT to replenish the supply of nickels in the latter. If the nickel tube should be full, this condition will be sensed by the nickel feeler finger 223 on lever 219 and gate 37 will remain in closed position in passage NC2 during the reset cycle. As a result, when pin 33 is retracted, the nickel will be diverted via passage NC4 into passage NC3 and drop out into the escrow unit 391. Escrow door 405 is opened by the action of link 423 (operated by lever 203) and lever 417, and the nickel falls down in the escrow unit on the left side of deflector 409 and drops into the money box.

Assuming a purchaser has deposited a dime for purchase of a 5¢ item (situation B), the dime will have entered the dime chute, effected a two-step (10¢) advance of rotor 259 and come to rest on pin 45 in the dime chute passage DC2. Wiper W1 on the rotor then electrically interconnects the 10¢ contact C10 of the board 257 and the inner ring R0 and wiper W2 electrically interconnects the 5¢ contact C5 and the 5¢ change ring R5. When the purchaser pushes in a 5¢ push button switch of the vending machine to obtain a 5¢ item, vend circuit L6 is energized from line L1 via contact C5, wiper W2, ring R5, line L7, the upper contact of relay switch RA1 and line L11 to energize the vend relay and initiate a vend cycle for a 5¢ item. Reset motor 179 is energized in response to initiation of the vend cycle via line L14 to initiate a reset cycle, during which sample switch 525 is thrown onto its lower contact. This closes circuit L12, L13 to energize coil RAC of relay RA, throwing relay switches RA1-RA4 onto their lower contacts. With switch RA1 closed on its lower contact, coil RDC is energized as previously described to effect operation of the ejector motor 301 for a single stroke of nickel ejector slide 281 to eject one nickel, which is delivered to the customer in change via a suitable delivery system. The same reset operations as above described occur as a result of operation of reset motor 179, resulting in return of rotor 259 to zero position, retraction of pin 45, and opening of gate 49 (assuming tube DT is not full). On retraction of pin 45 and opening of gate 49, the deposited dime is released to drop into the dime tube DT to replenish the supply of dimes therein.

If the dime tube is full, gate 49 remains closed, and is diverted through the escrow unit to the money box.

Assuming that a purchaser has deposited a quarter for purchase of a 5¢ item (situation C), the quarter will have passed through the quarter chute, and effected a five-step (25¢) advance of rotor 259. Wipers W1, W2, W3, W4 and W5 then electrically interconnect contacts C25, C20, C14, C10 and C5, respectively. When the purchaser pushes in a 5¢ push button switch of the vending machine to obtain a 5¢ item, the vend circuit L6 is energized from line L1 via contact C5, wiper W5, ring R20, line L10, the upper contact of relay switch RA4 and line L11 to energize the vend relay and initiate a vend cycle for a 5¢ item. Reset motor 179 is energized via line L14 to initiate a reset cycle, during which sample switch 525 is thrown onto its lower contact to energize coil RAC and throw switches RA1-RA4 onto their lower contacts. With switch RA4 closed on its lower contact, coils RBC1 and RCC1 of relays RB and RC are energized as previously described to effect operation of ejector motor 301 for two strokes of the nickel ejector slide 281 and one stroke of the dime ejector slide 291 to eject two nickels and a dime which are delivered in change to the customer. In this regard, an effect of energizing relay RC is to energize the second nickel solenoid 363, and the effect of energizing relay RB is to energize the dime solenoid 381. The effect of energizing the second nickel solenoid 363 is to release latch 345 for a second cycle of ejector motor 301, with the result that the nickel ejector slide is stroked twice and two nickels are ejected from the nickel tube NT. The effect of energizing the dime solenoid is to couple the dime ejector slide 291 to the nickel ejector slide 281 via hook 373 and pin 387 on the first stroke of the nickel ejector slide for a single stroke of the dime ejector slide to eject a dime from the dime tube DT. Thus, two nickels and a dime (20¢) are delivered in change. Additionally, reset operations as above described are effected, and the escrow door 405 is opened to pass the quarter to the money box.

Assuming that a purchaser has deposited a dime or two nickels for purchase of a 10¢ item (situation D), the dime or two nickels will have effected a two-step 10¢ advance of rotor 259 so that wiper W1 bridges the 10¢ contact C10 and ring R0. When the purchaser pushes in a 10¢ push button switch of the vending machine to obtain a 10¢ item, the vend circuit L6 is energized from line L2 via contact C10, wiper W1 and ring R0, resulting in operation of the coin apparatus similarly to the operation above described for situation A, no change being issued. If a dime has been deposited, it is passed to the dime tube DT if not full, otherwise it is passed through the escrow unit to the money box. If two nickels have been deposited, they are passed to the nickel tube NT if not full, otherwise they are passed through the escrow unit to the money box.

Assuming a purchaser has deposited a quarter for purchase of a 10¢ item (situation E), the quarter will have effected a five step 25¢ advance of rotor 259 so that wiper W4 bridges contact C10 and ring R15. When the purchaser pushes in a 10¢ push button switch of the vending machine, the vend circuit L6 is energized from line L2 via contact C10, wiper W4, ring R15, line L9, the upper contact of relay switch RA3 and line L11 to energize the vend relay and initiate a vend cycle for a 15¢ item. Reset motor 179 is energized to initiate a reset cycle, during which sample switch 525 is thrown onto its lower contact and coil RAC is energized to throw switches RA1-RA4 onto their lower contacts. When switch RA3 closes on its lower contact, coil RBC2 of relay is energized as previously described to effect operation of the ejector motor 301 to actuate the nickel ejector slide 281 once and the dime ejector slide 291 once to eject a nickel and a dime.

Assuming a purchaser has deposited 15¢ (three nickels or a dime and a nickel) for purchase of a 15¢ item (situation F), rotor 259 will have been advanced three steps so that wiper W1 bridges contact C15 and ring R0.

When he pushes in a 15¢ push button of the vending machine, the vend circuit L6 is energized from line L3 via contact C15, wiper W1 and ring R0, resulting in operation of the apparatus similarly to the operation above described for situation A, no change being issued.

Assuming a purchaser has deposited two dimes for purchase of a 15¢ item (situation G), the two dimes will have effected a four step advance of rotor 259 so that wiper W2 bridges contact C15 and ring R5. When the purchaser pushes in a 15¢ push button of the vending machine, the vend circuit L6 is energized from line L3 via contact C15, wiper W2, ring R5, line L7, the upper contact of relay switch RA1 and line L11, resulting in delivery of a nickel in change in the same manner as above described for situation B.

Assuming a purchaser has deposited a quarter for purchase of a 15¢ item (situation H), the rotor will have been advanced five steps so that wiper W3 bridges contact C15 and ring R10. When he pushes in a 15¢ push button switch of the vending machine, the vend circuit L6 is energized from line L3 via contact C15, wiper W3, ring R10, line L8, the upper contact of relay switch RA2, and line L11. Reset motor 179 is energized via line L14 to initiate a reset cycle, during which sample switch 525 is thrown on to its lower contact to energize coil RAC and throw switches RA1-RA4 onto their lower contacts. When switch RA2 closes on its lower contact, coil RCC2 of relay RC is energized as previously described to effect operation of the ejector motor 301 to stroke the nickel ejector slide 281 twice to eject two nickels for delivery in change.

Assuming a purchaser has deposited 20¢ in coin, i.e., four nickels, two dimes, or a dime and two nickels, for purchase of a 20¢ item (situation I), rotor 259 will have been advanced four steps so that wiper W1 bridges contact C20 and ring R0. When he pushes in a 20¢ push button switch of the vending machine, vend circuit L6 is energized from line L4 via contact C20, wiper W1 and ring R0, resulting in operation of the apparatus similarly to the operation described for siutation A, no change being issued.

Assuming a purchaser has deposited a quarter for purchase of a 20¢ item (situation J), rotor 259 will have been advanced five steps so that wiper W2 bridges contact C20 and ring R5. When he pushes in a 20¢ push button switch of the vending machine, a circuit is established via line L4, contact C20, wiper W2, ring R5 and line L7 to the center terminal of relay switch RA1. The apparatus then functions similarly to its operation described above for situation B to deliver a nickel in change.

Assuming a purchaser has deposited a quarter for purchase of a 25¢ item (situation K), the rotor will have been advanced five steps so that wiper W1 bridges contact C25 and ring R0. When he pushes in a 25¢ push button of the vending machine, a circuit is established via line L5, contact C25, wiper W1, ring R0 and line L6, resulting in operation of the apparatus similarly to the operation above described for siutation A, no change being issued.

Assuming a purchaser has deposited three dimes for purchase of a 25¢ item (situation L), the rotor will have been advanced six steps so that wiper W2 bridges contact C25 and ring R5. When he pushes in a 25¢ push button switch of the vending machine, a circuit is established from line L5 via contact C25, wiper W2, ring R5 and line L7 to the center terminal of relay switch RA1. The apparatus then functions as in the case of situation B to issue a nickel in change.

If the nickel tube NT or the dime tube DT becomes empty (situation M), switch 545 or 549, as the case may be, closes on its upper contact. The result of this is to open the L25 circuit so as to null the relays RB, RC and RD and thereby null the operation of the ejector motor. However, the apparatus remains in operation to handle the vending of 5¢, 10¢, 15¢, 20¢ and 25¢ items, provided exact amounts in coin are deposited. For example, a purchaser may deposit a nickel for purchase of a 5¢ item, resulting in a one step advance of rotor 259 so that wiper W1 bridges contact C5 and ring R0. On pushing in a 5¢ push button switch of the vending machine, the vend circuit L6 is energized from line L1 via contact C5, wiper W1 and ring R0 to energize the vend relay in the vending machine to effect vending of a 5¢ item. When either of switches 545 or 549 is thrown onto its upper contact, lamp 557 is energized to indicate that exact amounts are to be deposited. The same effect is obtained by throwing the no-change switch 553 to its no-change position.

Cancellation of a prospective purchase after deposit of a coin or coins and return of the deposited coin or coins (situation N) is effected by pushing down the coin return bar 477. This results in closure of the upper coin return switch 483 on its lower contact and closure of the lower coin return switch 491. This establishes a circuit via line L43, the lower contact of switch 483, switch 491 and line L43 through the escrow solenoid 449, and the upper contact of the sample switch 525 and line L13. On energization of the escrow solenoid, latch 443 is released to permit lever 435 to swing clockwise from its FIG. 20 position to swing deflector 409 to its FIG. 4 coin return position. As lever 435 swings clockwise, it shifts wire 465 upward to bring the upper end 469 of the wire to the upper end of the slot 471 in lever 249. Via suitable interconnection in the vending machine, it also establishes circuit L14 for the reset motor to initiate a reset cycle. On reset, pins 33 and 45 are retracted from coin passages NC2 and DC2 to release a nickel or two nickels that may have been held back by pin 33 and a dime that may have been held back by pin 45. Wire 465, having been shifted upward as described, holds lever 249 against being let off by lever 203. As a result, stud 247 remains in engagement with tab 245 on lever 239, and gates 37 and 49 remain closed. Accordingly, a released nickel or released nickels and a released dime, dropping down in passages NC2 and DC2, strike gates 37 and 49 and roll down NC4 and DC4 to passages NC3 and DC3 and out of the lower ends of the latter passages into the escrow unit. With escrow door 405 opened and with deflector 409 in its FIG. 4 coin-return position as above described, these coins and any additional nickels or dimes or a quater that may have been escrowed on the escrow door 405 are returned to the purchaser.

While, as illustrated, the apparatus is set up for handling the vending of 5¢, 10¢, 15¢, 20¢ and 25¢ items, it will be understood that it may be set up for handling vending of items at other prices, and at different numbers of prices, simply by plugging into appropriate terminals in the T5-T125 series on the circuit board 257. For example, lines may be plugged into terminals T30, T35 and T40 for handling vending of 30¢, 35¢ and 40¢ items, these lines being energized on pushing in 30¢, 35¢ and 40¢ push button switches of the vending machine. The apparatus will then issue a nickel in change on deposit of a quarter and a dime for purchase of a 30¢ item, two nickels and a dime in change on deposit of two quarters for purchase of a 30¢ item, a nickel in change on deposit of four dimes for purchase of a 35¢ item, etc.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Coin apparatus for controlling the operation of a vending machine for vending items at different prices and for making change in accordance with the amount in coin deposited in the apparatus and the price of an item selected by a purchaser comprising: a totalizer switch having a series of fixed contacts spaced at equal intervals, said fixed contacts constituting price contacts representing different prices, and a movable switch member carrying a plurality of contact wipers adapted for engagement with said fixed price contacts, said wipers being spaced at intervals corresponding to the spacing of said fixed price contacts and insulated from one another, said movable switch member being movable away from and back to a zero position in which the first of said wipers is spaced one interval back of the first price contact of the series; means responsive to deposit of coins in the apparatus for moving said member away from its zero position a number of intervals corresponding to the amount deposited thereby to advance the first wiper into engagement with the price contact representing the amount deposited and to bring the other wipers into engagement with preceding price contacts; means for holding coins to be issued in change; electrically actuated means for ejecting coins in change from said holding means; a vend circuit interconnected with each of said wipers for energization thereof in response to input of power from the vending machine to a price contact engaged by any one of said wipers; and electrical means for controlling said ejecting means to issue different amounts in change having separate interconnections with the wipers other than the first wiper.

2. Coin apparatus for controlling the operation of a vending machine for vending items at different prices in the series 5¢, 10¢, 15¢, 20¢, 25¢, etc. and for making change in accordance with the difference between the amount in coin deposited in the apparatus and the price of an item selected by a purchaser comprising: a totalizer switch having a series of fixed contacts spaced at equal intervals, said fixed contacts constituting price contacts representing prices in the series 5¢, 10¢, 15¢, 20¢, 25¢, etc., and a movable switch member carrying at least five contact wipers adapted for engagement with said fixed price contacts, said wipers being spaced at intervals corresponding to the spacing of said fixed price contacts and insulated from one another, said movable switch member being movable away from and back to a zero position in which a first of said wipers is spaced one interval back of the 5¢ price contact and the second, third, fourth and fifth wipers are respectively spaced two, three, four and five intervals back of the 5¢ price contact; means responsive to deposit of coins in the apparatus for moving said member away from its zero position a number of intervals corresponding to the amount deposited thereby to advance said first wiper into engagement with the price contact representing the amount deposited and to bring the second, third, fourth and fifth wipers into engagement with the price contacts representing 5¢, 10¢, 15¢ and 20¢ less than the amount deposited; means for holding a supply of coins to be issued in change; electrically actuated means for ejecting coins in change from said supply; a vend circuit interconnected with each of said wipers for energization thereof in response to input of power from the vending machine to a price contact engaged by any one of said wipers; control means for said ejecting means having a first circuit which when energized actuates the ejecting means to issue 5¢ in change, a second circuit which when energized actuates the ejecting means to issue 10¢ in change, a third circuit which when energized actuates the ejecting means to issue 15¢ in change and a fourth circuit which when energized actuates the ejecting means to issue 20¢ in change; a connection between the second wiper and said first circuit for energizing said first circuit for delivery of 5¢ in change in response to input of power from the vending machine to a price contact engaged by the second wiper; a connection between the third wiper and said second circuit for energizing said second circuit for delivery of 10¢ in change in response to input of power from the vending machine to a price contact engaged by the third wiper; a connection between the fourth wiper and said third circuit for energizing said third circuit for delivery of 15¢ in change in response to input of power to a price contact engaged by the fourth wiper; and a connection between the fifth wiper and said fourth circuit for energizing said fourth circuit for delivery of 20¢ in change in response to input of power to a price contact engaged by the fifth wiper.

3. Coin apparatus as set forth in claim 2 having means for disconnecting said control means for operation of said apparatus to control operation of the vending machine for vending items at said different prices on deposit of exact amounts in coin without making change.

4. Coin apparatus as set forth in claim 3 wherein said disconnecting means is responsive to depletion of the supply of change coins.

5. Coin apparatus as set forth in claim 4 wherein said disconnecting means includes a manually operable switch for manually effecting disconnection of said control means.

6. Coin apparatus as set forth in claim 2 further comprising means for replenishing the supply of change coins with coins deposited in the apparatus.

7. Coin apparatus as set forth in claim 2 wherein the means for holding coins to be issued in change comprises a nickel tube and a dime tube, said ejecting means comprises a nickel ejector and a dime ejector, and said control means is operable to actuate the nickel ejector once on energization of said first circuit, to actuate the nickel ejector twice on energization of said second circuit, to actuate the nickel ejector once and the dime ejector once on energization of said third circuit, and to actuate the nickel ejector twice and the dime ejector once on energization of said fourth circuit.

8. Coin apparatus as set forth in claim 7 wherein said ejecting means comprises an ejector motor having an output shaft coupled to the nickel ejector for actuating the latter through a stroke on a revolution of said shaft, said control means includes means for selectively holding the ejector motor energized for a single revolution of said shaft to eject one nickel or for two revolutions of said shaft to eject two nickels, and wherein means is provided for coupling together the dime ejector and the nickel ejector on a first stroke of the nickel ejector for ejecting a dime along with a first nickel.

9. Coin apparatus as set forth in claim 7 wherein the means responsive to deposit of coins comprises a nickel chute, a dime chute and a quarter chute, and totalizer means actuated in response to passage of coins through said chutes for moving said switch member, and wherein said apparatus further comprises means for holding in escrow coins dropping out of said chutes either for delivery to a money box or for return to a customer, reset means for resetting the totalizer means and said switch member to zero position, means operable in response to a vend operation for operating said reset means and actuating said escrow means for delivery of escrowed coins to the money box, and customer-actuated coin return means for operating said reset means and actuating said escrow means for return of escrowed coins to the customer.

10. Coin apparatus as set forth in claim 9 further comprising means for arresting at least one nickel and a dime in the nickel and dime chutes after they have actuated said totalizer means, means operable by said reset means for releasing said arresting means for passage of any released nickel or dime either to the nickel and dime tubes or the escrow means, and means operable in the nickel and dime chutes for effecting passage of any released nickel or dime to the escrow means or the nickel and dime tubes on a vend operation and for passage of any released nickel or dime only to the escrow means on a coin return operation.

11. Coin apparatus as set forth in claim 10 wherein said means operable in the nickel and dime chutes is also responsive to filling of the nickel and dime tubes for passage of any released nickel or dime to the escrow means rather than to the nickel and dime tubes.

12. Coin apparatus as set forth in claim 2 wherein said movable switch member is a rotary member, said switch has five concentric conductive fixed contact rings around the axis of said rotary switch member, said price contacts are arranged in a circular series around the outermost ring, the first wiper bridging the price contacts and a first ring, the second wiper bridging the price contacts and a second ring, the third wiper bridging the price contacts and a third ring, the fourth wiper bridging the price contacts and a fourth ring, and the fifth wiper bridging the price contacts and the fifth ring, said first ring being included in said vend circuit and the second, third, fourth and fifth rings being included in said connections between the second, third, fourth and fifth wipers and said first, second, third and fourth circuits.

13. Coin apparatus as set forth in claim 12 wherein said means responsive to deposit of coins comprises a nickel chute, a dime chute and a quarter chute, totalizer mechanism having a toothed escapement wheel connected to said rotary switch member, spring means biasing the wheel to escape from a zero position corresponding to the zero position of the rotary switch member, means for latching the wheel, means actuated by a nickel passing through the nickel chute for actuating the latching means for a one-tooth escape of the wheel and actuated by a dime passing through the dime chute for actuating the latching means for a two-tooth escape of the wheel, and means actuated by a quarter passing through the quarter chute for actuating the latching means for a five-tooth escape of the wheel.

14. Coin apparatus for controlling the operation of a vending machine and for making change comprising: a nickel chute, a dime chute and a quarter chute, a totalizer actuated in response to passage of coins through said chutes, reset means for resetting said totalizer, change-making means controlled by said totalizer and including a nickel tube for holding a supply of nickels to be issued in change and a dime tube for holding a supply of dimes to be issued in change, means for holding in escrow coins dropping out of said chutes either for delivery to a money box or for return to a customer, means operable in response to a vend operation for operating said reset means and actuating said escrow means for delivery of escrowed coins to the money box, customer-actuated coin return means for operating said reset means and actuating said escrow means for return of escrowed coins to the customer, means for arresting at least one nickel and a dime in the nickel and dime chutes after they have actuated the totalizer, means operable by said reset means for releasing said arresting means for passage of any released nickel or dime either to the nickel and dime tubes or the escrow means, and means operable in the nickel and dime chutes for effecting passage of any released nickel or dime to the escrow means or the nickel and dime tubes on a vend operation and for passage of any released nickel or dime only to the escrow means on a coin return operation.

15. Coin apparatus as set forth in claim 14 wherein said means operable in the nickel and dime chutes is also responsive to filling of the nickel and dime tubes for passage of any released nickel or dime to the escrow means rather than to the nickel and dime tubes.

16. In a coin apparatus adapted for making change, means for holding a supply of nickels, means for holding a supply of dimes, an ejector operable through a stroke for ejecting a nickel from the nickel supply, an ejector operable through a stroke for ejecting a dime from the dime supply, means for operating the nickel ejector through a first stroke for ejecting a first nickel and through two successive strokes for ejecting a first and a second nickel, and means for coupling together the dime ejector and the nickel ejector on a first stroke of the nickel ejector for ejecting a dime along with a first nickel.

17. In a coin apparatus as set forth in claim 16, said operating means comprising an electric motor, a shaft driven by the motor and connected to the nickel ejector for actuating the nickel ejector through a stroke on a revolution of the shaft, a cam driven by the shaft, a holding switch for the motor, follower means actuated by the cam for actuating the switch to deenergize the motor upon a revolution of the shaft, and means for deactuating said follower means for a second revolution of said shaft.

References Cited

UNITED STATES PATENTS

| | | | |
|---|---|---|---|
| 2,076,564 | 4/1937 | Hoban | 194—10 X |
| 2,754,950 | 7/1956 | Harris | 133—5 X |
| 2,974,772 | 3/1961 | Zeigle et al. | 133—2 X |
| 3,002,602 | 10/1961 | Giepen | 194—10 |
| 3,042,173 | 7/1962 | Thomas et al. | 194—15 |
| 3,107,000 | 10/1963 | Krakaver et al. | 194—2 |
| 3,114,446 | 12/1963 | Diaz | 194—9 |

SAMUEL F. COLEMAN, *Primary Examiner.*